US012776566B2

(12) United States Patent
Lee et al.

(10) Patent No.: US 12,776,566 B2
(45) Date of Patent: Oct. 27, 2026

(54) ELECTRONIC DEVICE COMPRISING ANTENNA

(71) Applicant: SAMSUNG ELECTRONICS CO., LTD., Suwon-si (KR)

(72) Inventors: Sunghyup Lee, Suwon-si (KR); Hoonsang Yoo, Suwon-si (KR); Jungsik Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 362 days.

(21) Appl. No.: 18/377,628

(22) Filed: Oct. 6, 2023

(65) Prior Publication Data

US 2024/0120643 A1 Apr. 11, 2024

Related U.S. Application Data

(63) Continuation of application No. PCT/KR2023/015437, filed on Oct. 6, 2023.

(30) Foreign Application Priority Data

Oct. 6, 2022 (KR) ........................ 10-2022-0127899
Nov. 4, 2022 (KR) ........................ 10-2022-0146152

(51) Int. Cl.
*H01Q 1/24* (2006.01)
*H01Q 21/30* (2006.01)

(52) U.S. Cl.
CPC ............. *H01Q 1/243* (2013.01); *H01Q 21/30* (2013.01)

(58) Field of Classification Search
USPC .......................................................... 343/702
See application file for complete search history.

(56) References Cited

U.S. PATENT DOCUMENTS 7,639,187 B2 * 12/2009 Caballero .............. H01Q 1/244 343/702
10,218,396 B2 2/2019 Son et al.
(Continued)

FOREIGN PATENT DOCUMENTS

CN 110336113 B * 7/2021 ............... H01Q 1/22
KR 10-1600268 B1 3/2016
(Continued)

OTHER PUBLICATIONS

International Search Report (PCT/ISA/210) dated Jan. 18, 2024, issued by the International Searching Authority in International Application No. PCT/KR2023/015437.
(Continued)

*Primary Examiner* — Dimary S Lopez Cruz
*Assistant Examiner* — Brandon Sean Woods
(74) *Attorney, Agent, or Firm* — Sughrue Mion, PLLC

(57) ABSTRACT

An electronic device includes: a plate; a side frame provided at an edge of the plate, the side frame including a first sidewall extending in at least one axial direction and including at least one conductive portion; a printed circuit board provided on a surface of the plate and including at least one ground area; a key assembly provided on the side frame and including a first flexible circuit board connected to the printed circuit board; and at least one antenna module including: the at least one conductive portion; a first connection member provided inside the first sidewall, the first connection member being electrically connected to the at least one conductive portion and the first flexible circuit board; a second connection member provided inside the first sidewall and spaced apart from the first connection member, the second connection member being electrically connected to the at least one conductive portion and the first flexible circuit board; and a third connection member between the
(Continued)

first connection member and the second connection member, the third connection member being electrically connected to the at least one conductive portion and the at least one ground area.

20 Claims, 12 Drawing Sheets

(56) References Cited

U.S. PATENT DOCUMENTS

| | | | | |
|---|---|---|---|---|
| 10,673,127 | B2 * | 6/2020 | Ruaro | H01Q 1/273 |
| 11,387,569 | B2 | 7/2022 | Park et al. | |
| 2011/0024591 | A1 * | 2/2011 | Gordon | E06B 1/6015 29/428 |
| 2014/0220912 | A1 | 8/2014 | Chuang et al. | |
| 2016/0028148 | A1 * | 1/2016 | Tan | H01Q 1/44 343/702 |
| 2018/0175484 | A1 | 6/2018 | Tsai et al. | |
| 2019/0229429 | A1 * | 7/2019 | Wu | H01Q 5/35 |
| 2020/0212947 | A1 | 7/2020 | Son et al. | |
| 2021/0280971 | A1 * | 9/2021 | Kim | H01Q 21/28 |
| 2021/0320396 | A1 * | 10/2021 | Kim | H01Q 9/0421 |
| 2023/0247789 | A1 | 8/2023 | Yoo et al. | |

FOREIGN PATENT DOCUMENTS

| | | | |
|---|---|---|---|
| KR | 10-1676598 | B1 | 11/2016 |
| KR | 10-2017-0013682 | A | 2/2017 |
| KR | 10-2020-0084617 | A | 7/2020 |
| KR | 10-2020-0130028 | A | 11/2020 |
| KR | 10-2022-0039236 | A | 3/2022 |
| KR | 10-2022-0046990 | A | 4/2022 |
| KR | 10-2410706 | B1 | 6/2022 |

OTHER PUBLICATIONS

Written Opinion (PCT/ISA/237) dated Jan. 18, 2024, issued by the International Searching Authority in International Application No. PCT/KR2023/015437.

Communication issued on Aug. 26, 2025 by the European Patent Office in European Patent Application No. 23875269.5.

Communication dated Aug. 24, 2026, issued by Intellectual Property India in Indian Application No. 202517040171.

* cited by examiner

ELECTRONIC DEVICE COMPRISING ANTENNA

CROSS-REFERENCE TO RELATED APPLICATIONS

This application is a by-pass continuation application of International Application No. PCT/KR2023/015437, filed on Oct. 6, 2023, which is based on and claims the benefit of a Korean Patent Application No. 10-2022-0127899, filed on Oct. 6, 2022, in the Korean Intellectual Property Office, and to a Korean Patent Application No. 10-2022-0146152, filed on Nov. 4, 2022, in the Korean Intellectual Property Office, the disclosures of each of which are incorporated by reference herein in their entireties.

BACKGROUND

1. Field

Embodiments of the disclosure relate to an antenna assembly and an electronic device including the same.

2. Description of Related Art

The term "electronic device" may mean a device performing a particular function according to its equipped program, such as a home appliance, an electronic scheduler, a portable multimedia player, a mobile communication terminal, a tablet PC, a video/sound device, a desktop PC or laptop computer, a navigation for automobile, etc. For example, the electronic devices may output stored information as voices or images.

As the demand for mobile communication increases, and the degree of integration of electronic devices increases, various technologies have been developed to enhance the portability of the electronic device and user convenience in use of multimedia functions. An electronic device may include an antenna device that provides wireless communication in various frequency bands. As such an antenna device meets a high gain and wide beam coverage, communication performance of the electronic device may be provided with stable quality under a commercialized wireless communication network environment. Recently, communication such as mobile communication (e.g., 2G/3G/4G/UMTS/LTE), Bluetooth, Wi-Fi, NFC, GPS, and UWB in low/medium/high frequency bands of several GHz or less supporting multiple bands, as well as millimeter wave communication having a frequency band of several tens of GHz or more (e.g., a high-band frequency of 28 GHz or more), has been used to meet demand for soaring data traffic.

The foregoing information is provided merely as background information for a better understanding of the disclosure.

SUMMARY

According to an aspect of the disclosure, an electronic device includes: a plate; a side frame provided at an edge of the plate, the side frame including a first sidewall extending in at least one axial direction and including at least one conductive portion; a printed circuit board provided on a surface of the plate and including at least one ground area; a key assembly provided on the side frame and including a first flexible circuit board connected to the printed circuit board; and at least one antenna module including: the at least one conductive portion; a first connection member provided inside the first sidewall, the first connection member being electrically connected to the at least one conductive portion and the first flexible circuit board; a second connection member provided inside the first sidewall and spaced apart from the first connection member, the second connection member being electrically connected to the at least one conductive portion and the first flexible circuit board; and a third connection member between the first connection member and the second connection member, the third connection member being electrically connected to the at least one conductive portion and the at least one ground area.

The at least one antenna module may further include at least one first signal line accommodated in the first flexible circuit board and configured to transmit a feeding signal, and the at least one first signal line is electrically connected to at least one of the first connection member or the second connection member.

The first flexible circuit board may include at least one second signal line configured to transmit a digital signal and electrically connecting the key assembly and the printed circuit board.

The electronic device may further include at least one electrical component disposed on the surface of the plate, and the first flexible circuit board does not overlap the electrical component.

The electrical component may include: a battery; and at least one second flexible circuit board configured to connect the battery and the printed circuit board.

The at least one first signal line may include a plurality of first signal lines connected to the first connection member and the second connection member, the at least one antenna module may include a plurality of antenna modules; and the plurality of antenna modules may include: a first antenna module electrically connected to the first connection member; and a second antenna module electrically connected to the second connection member and spaced apart from the first antenna module along the first sidewall with the third connection member interposed therebetween.

The first antenna module may include the first connection member and a first conductive portion of the at least one conductive portion, the first conductive portion being configured to receive a feeding signal from the first connection member, the second antenna module may include the second connection member and a second conductive portion of the at least one conductive portion, the second conductive portion being configured to receive a feeding signal from the second connection member, and the first conductive portion may be provided on a portion of the first sidewall, and the second conductive portion may be provided on another portion of the first sidewall spaced apart from the first conductive portion with the third connection member interposed therebetween.

The first antenna module may be grounded to the third connection member through an electrical path formed between the first connection member and the third connection member, and the second antenna module may be grounded to the third connection member through an electrical path formed between the second connection member and the third connection member.

The first sidewall may further include a slit area adjacent to the first connection member, the first connection member may be provided between the slit area and the third connection member, and the first antenna module may be a slit antenna.

The second antenna module may be a slot antenna.

The key assembly may further include: at least one key member at least partially visually exposed to an outside of the electronic device through an opening in a portion of the first sidewall;

at least one shaft member inside the first sidewall and configured to receive an external input applied to the key member; and a sensor module inside the first sidewall and configured to detect the external input transferred from the at least one shaft member, and the first flexible circuit board may be electrically connected to the sensor module and may further include at least one second signal line configured to transmit a digital signal.

The first sidewall may further include a plurality of extension members protruding toward the first connection member, the second connection member, and the third connection member, and the plurality of extension members may be electrically connected to the first connection member, the second connection member, and the third connection member.

The plurality of extension members may be electrically connected to the at least one conductive portion of the first sidewall.

The first flexible circuit board may include: a first board portion including a surface facing the first sidewall and on which at least one of the first connection member, the second connection member, or the third connection member is disposed; and a second board portion connecting the first board portion and the printed circuit board.

The electronic device may further include: an electronic component between the first sidewall and the printed circuit board; and a battery spaced apart from the electronic component in at least one axial direction in which the first sidewall extends, and at least a portion of the second board portion is between the electronic component and the battery.

According to an aspect of the disclosure, an electronic device includes: a plate; a side frame provided at an edge of the plate and extending in at least one axial direction, the side frame including a first sidewall including at least one conductive portion; a printed circuit board provided on a surface of the plate and including at least one ground area; a key assembly provided on a portion of the side frame and including a first flexible circuit board connected to the printed circuit board; and an antenna assembly including: the at least one conductive portion; a first connection member provided inside the first sidewall, the first connection member being electrically connected to the at least one conductive portion; a second connection member provided inside the first sidewall and spaced apart from the first connection member, the second connection member being electrically connected to the at least one conductive portion; and a third connection member between the first connection member and the second connection member, the third connection member being electrically connected to the at least one conductive portion, wherein the second connection member is electrically connected to the first flexible circuit board, and the third connection member is electrically connected to the at least one ground area.

The antenna assembly may further include at least one first signal line accommodated in the first flexible circuit board and configured to transmit a feeding signal, and the at least one first signal line may be electrically connected to at least one of the first connection member or the second connection member.

The first flexible circuit board may include at least one second signal line configured to transmit a digital signal and electrically connecting the key assembly and the printed circuit board.

The first connection member may be connected to the second connection member at one point through a first electrical path, and the second connection member may be connected to the at least one ground area through a second electrical path from the one point.

The first sidewall may further include a slit area adjacent to the first connection member, the first connection member may be between the slit area and the third connection member, and the antenna assembly may include a slit antenna.

BRIEF DESCRIPTION OF THE DRAWINGS

The foregoing and other aspects, configurations, and/or advantages of certain embodiments of the present disclosure will be more apparent from the following description taken in conjunction with the accompanying drawings, in which.

Throughout the drawings, like reference numerals may be assigned to like parts, components, and/or structures.

DETAILED DESCRIPTION

The following description taken in conjunction with the accompanying drawings is provided to aid in understanding various embodiments of the disclosure as defined by the claims and equivalents thereto. The following description may include various specific details to aid understanding, but these may be considered exemplary only. Accordingly, one of ordinary skill in the art will recognize that various changes and modifications may be made to the various embodiments described herein without departing from the scope and spirit of the disclosure. Descriptions of well-known functions and configurations may be omitted for clarity and conciseness.

The terms and words used in the following description and claims are not limited to the dictionary meaning, but are used only by the inventors to enable a clear and consistent understanding of the disclosure. Accordingly, it will be apparent to one of ordinary skill in the art that the following description of various embodiments of the present disclosure is provided by way of example only and not to limit the disclosure as defined by the appended claims and equivalents thereof.

As used herein, the singular forms "a," "an," and "the" are intended to include the plural forms as well, unless the context clearly indicates otherwise. For example, the phrase "surface of a component" may refer to one or more of surfaces of the component.

Figure 1:
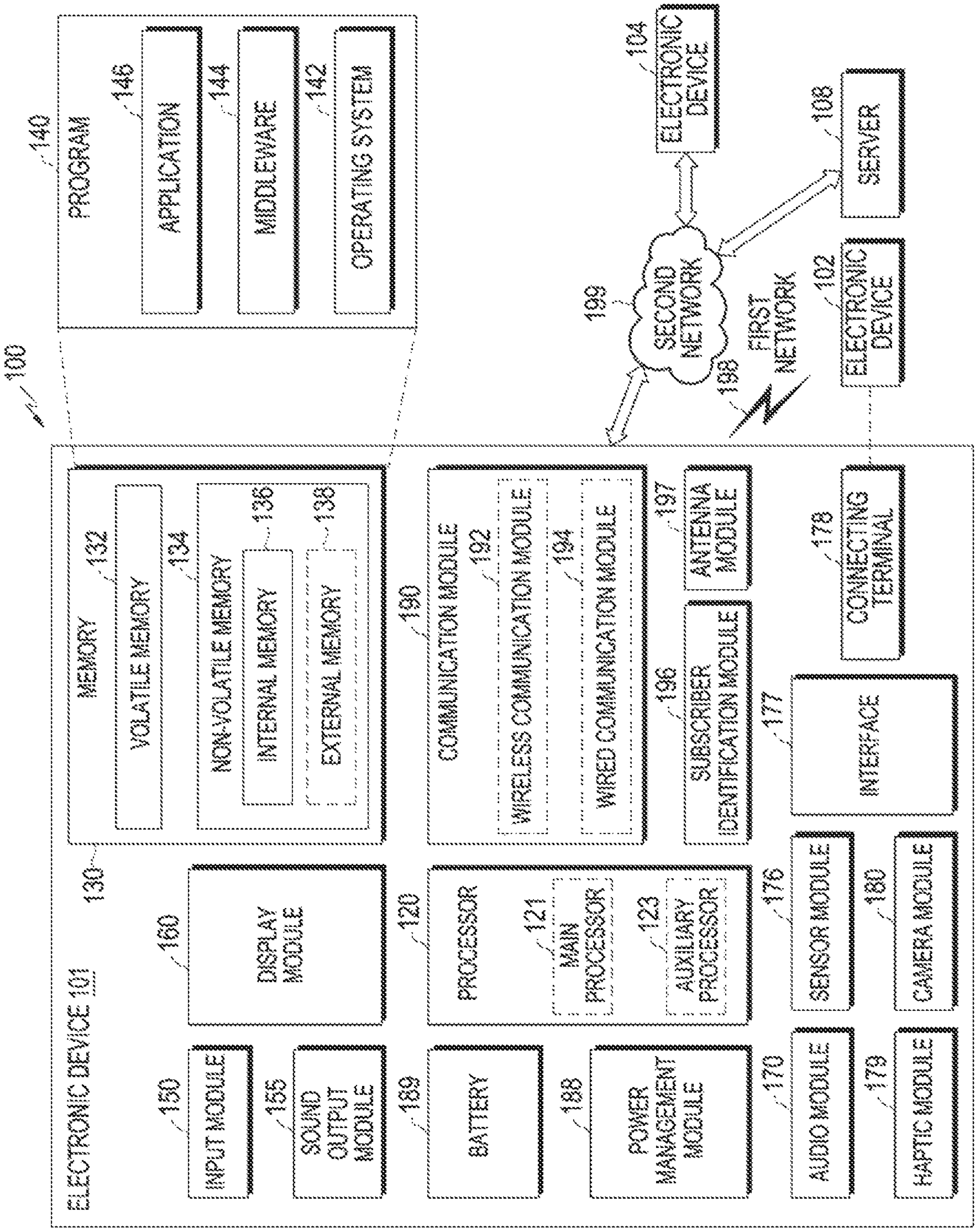
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. In an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following detailed description, a length direction, a width direction, and/or a thickness direction of the electronic device may be mentioned and may be defined as a "Y-axis direction," "X-axis direction", and/or "Z-axis direction," respectively. In one or more embodiments, "negative/positive (−/+)" may be mentioned together with the Cartesian coordinate system exemplified in the drawings with respect to the direction in which the component is oriented. For example, the front surface of the electronic device or housing may be defined as a "surface facing in the +Z direction," and the rear surface may be defined as a "surface facing in the −Z direction". In an embodiment, the side surface of the electronic device or housing may include an area facing in the +X direction, an area facing in the +Y direction, an area facing in the −X direction, and/or an area facing in the −Y direction. In another embodiment, the "X-axis direction" may mean including both the "−X direction" and the "+X direction". It should be noted that the directions are so defined with respect to the Cartesian coordinate system shown in the drawings for the sake of brevity of description, and the description of these directions or components do not limit an embodiment of the disclosure. For example, the direction in which the front surface or rear surface faces may be varied depending on the unfolded state or folded state of the electronic device, and the above-mentioned directions may be interpreted as different ones depending on the user's way to grip.

Figure 2:
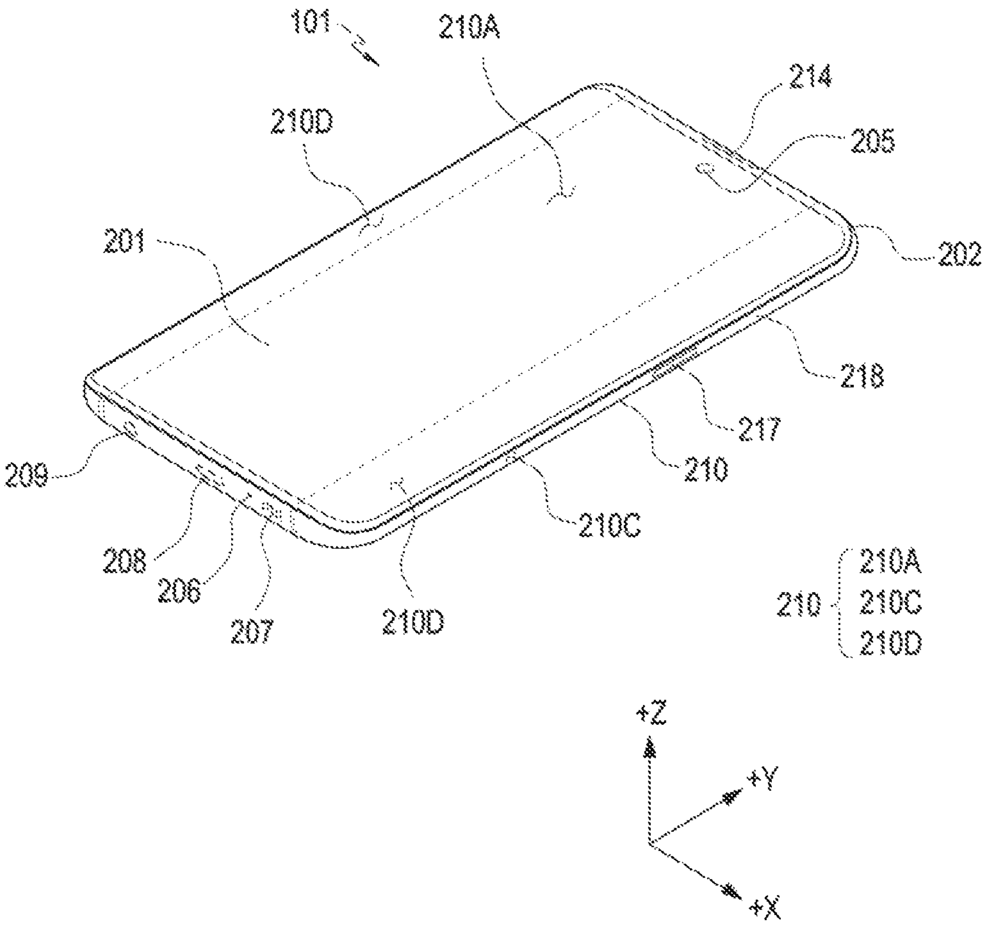
FIG. 2 is a front perspective view illustrating an electronic device according to an embodiment of the disclosure.
Figure 3:
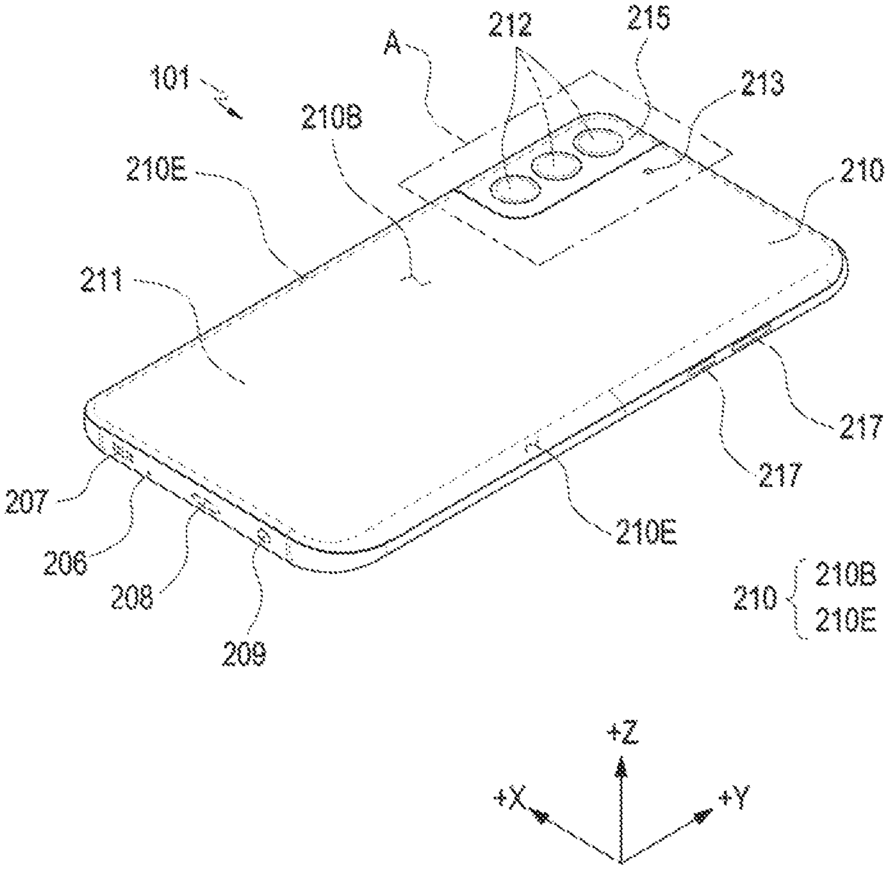
FIG. 3 is a rear perspective view illustrating an electronic device according to an embodiment of the disclosure.

The configuration of the electronic device 200 of FIGS. 2 and 3 may be identical in whole or part to the configuration of the electronic device 101 of FIG. 1.

FIG. 2 is a front perspective view illustrating an electronic device according to an embodiment of the disclosure. FIG. 3 is a rear perspective view illustrating an electronic device according to an embodiment of the disclosure.

Referring to FIGS. 2 and 3, according to an embodiment, an electronic device 101 may include a housing 210 with a front surface 210A, a rear surface 210B, and a side surface 210C surrounding a space between the front surface 210A and the rear surface 210B. In an embodiment, the housing 210 may denote a structure forming part of the front surface 210A, the rear surface 210B, and the side surface 210C of FIG. 2. According to an embodiment, at least part of the front surface 210A may have a substantially transparent front plate 202 (e.g., a glass plate or polymer plate including various coating layers). The rear surface 210B may be formed by a rear cover 211. The rear cover 211 may be formed of, e.g., glass, ceramic, polymer, metal (e.g., aluminum, stainless steel (STS), or magnesium), or a combination of at least two thereof. The side surface 210C may be formed by a side bezel structure (or "side wall") 218 that couples to the front plate 202 and the rear cover 211 and includes a metal and/or polymer. In an embodiment, the rear cover 211 and the side bezel structure 218 may be integrally formed together and include the same material (e.g., glass, metal, such as aluminum, or ceramic).

Referring to FIG. 2, according to an embodiment, the front plate 202 may include two first edge areas 210D, which seamlessly and bendingly extend from the first surface 210A to the rear cover 211, on both the long edges of the front plate 202. Referring to FIG. 3, according to an embodiment, the rear cover 211 may include two second edge areas 210E, which seamlessly and bendingly extend from the rear surface 210B to the front plate 202, on both the long edges. In an embodiment, the front plate 202 (or the rear cover 211) may include only one of the first edge areas 210D (or the second edge areas 210E). In an embodiment, the first edge areas 210D or the second edge areas 210E may partially be excluded. For example, when viewed from a side surface of the electronic device 101, the side bezel structure 218 may have a first thickness (or width) on a side surface that does not include the first edge areas 210D or the second edge areas 210E as described above. For example, when viewed from a side surface of the electronic device 101, the side bezel structure 218 may have a second thickness, which is smaller than the first thickness, on a side surface including the first edge areas 210D or the second edge areas 210E.

According to an embodiment, the electronic device 101 may include at least one of a display 201, audio modules

206, 207, and 214 (e.g., the audio module 170 of FIG. 1), a sensor module 176 (e.g., the sensor module of FIG. 1), camera modules 205, 212, and 213 (e.g., the camera module 180 of FIG. 1), a key input device 217 (e.g., the input module 150 of FIG. 1), and connector holes 208 and 209 (e.g., the connecting terminal 178 of FIG. 1). In an embodiment, the electronic device 101 may exclude at least one (e.g., the connector hole 209) of the components or may add other components.

According to an embodiment, the display 201 may be visually revealed through, e.g., a majority portion of the front plate 202. In an embodiment, at least a portion of the display 201 may be visually exposed through the front plate 202 forming the front surface 210A and the first edge areas 210D. In an embodiment, the edge of the display 201 may be formed to be substantially the same in shape as an adjacent outer edge of the front plate 202. In an embodiment, the interval between the outer edge of the display 201 and the outer edge of the front plate 202 may remain substantially even to give a larger area of exposure for the display 201.

According to an embodiment, the surface (or the front plate 202) of the housing 210 may include a screen display area formed as the display 201 is visually exposed. For example, the screen display area may include the front surface 210A and first edge areas 210D.

In an embodiment, a recess or opening may be formed in a portion of the screen display area (e.g., the front surface 210A or the first edge area 210D) of the display 201, and at least one or more of the audio module 214, sensor module, light emitting device, and camera module 205 may be aligned with the recess or opening. In an embodiment, at least one or more of the audio module 214, sensor module, camera module 205, fingerprint sensor, and light emitting device may be included on the rear surface of the screen display area of the display 201. In an embodiment, the display 201 may be disposed to be coupled with, or adjacent to, a touch detecting circuit, a pressure sensor capable of measuring the strength (pressure) of touches, and/or a digitizer for detecting a magnetic field-type stylus pen. According to an embodiment, at least part of the key input device 217 may be disposed in the first edge areas 210D and/or the second edge areas 210E.

According to an embodiment, the audio modules 206, 207, and 214 may include, e.g., a microphone hole 206 and speaker holes 207 and 214. A microphone for acquiring external sounds may be disposed in the microphone hole 206. In an embodiment, a plurality of microphones may be disposed to detect the direction of the sound. The speaker holes 207 and 214 may include an external speaker hole 207 and a phone receiver hole 214. In an embodiment, the speaker holes 207 and 214 and the microphone hole 206 may be implemented as a single hole, or speakers may be included without the speaker holes 207 and 214 (e.g., piezo speakers). The audio modules 206, 207, and 214 are not limited to the above-described structure. Depending on the structure of the electronic device 101, various design changes may be made, for example, only some of the audio modules may be mounted, or a new audio module may be added.

According to an embodiment, the sensor modules may generate an electrical signal or data value corresponding to an internal operating state or external environmental state of the electronic device 101. The sensor modules may include a first sensor module (e.g., a proximity sensor) and/or a second sensor module (e.g., a fingerprint sensor) disposed on the front surface 210A of the housing 210 and/or a third sensor module (e.g., an HRM sensor) and/or a fourth sensor module (e.g., a fingerprint sensor) disposed on the rear surface 210B of the housing 210. In an embodiment, the fingerprint sensor may be disposed on the rear surface 210B as well as on the front surface 210A (e.g., the display 201) of the housing 210. The electronic device 101 may include a sensor module, e.g., at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor. The sensor modules are not limited to the above-described structure. Depending on the structure of the electronic device 101, various design changes may be made, for example, only some of the sensor modules may be mounted, or a new sensor module may be added.

According to an embodiment, the camera modules 205, 212, and 213 may include a first camera module 205 disposed on the first surface 210A of the electronic device 101, and a rear camera device 212 and/or a flash 213 disposed on the rear surface 210B. The camera modules 205 and 212 may include one or more lenses, an image sensor, and/or an image signal processor. The flash 213 may include, e.g., a light emitting diode (LED) or a xenon lamp. In an embodiment, two or more lenses (an infrared (IR) camera, a wide-angle lens, and a telescopic lens) and image sensors may be disposed on one surface of the electronic device 101. The camera modules 205, 212, and 213 are not limited to the above-described structure. Depending on the structure of the electronic device 101, various design changes may be made, for example, only some of the camera modules may be mounted, or a new camera module may be added.

According to an embodiment, the electronic device 101 may include a plurality of camera modules (e.g., a dual camera or triple camera) having different attributes (e.g., angle of view) or functions. For example, a plurality of camera modules 205 and 212 including lenses having different angles of view may be configured, and the electronic device 101 may control to change the angle of view of the camera modules 205 and 212 performed by the electronic device 101 based on the user's selection. At least one of the plurality of camera modules 205 and 212 may form, for example, a wide-angle camera and at least another of the plurality of camera modules may form a telephoto camera. Similarly, at least one of the plurality of camera modules 205 and 212 may be a front camera and at least another of the plurality of camera modules may be a rear camera. Further, the plurality of camera modules 205 and 212 may include at least one of a wide-angle camera, a telephoto camera, and an infrared (IR) camera (e.g., a time of flight (TOF) camera, a structured light camera). According to an embodiment, the IR camera may be operated as at least a portion of the sensor module. For example, the TOF camera may be operated as at least a portion of a sensor module for detecting the distance to the subject.

According to an embodiment, the key input device 217 may be disposed on the side surface 210C of the housing 210. In an embodiment, the electronic device 101 may exclude all or some of the above-mentioned key input devices 217 and the excluded key input devices 217 may be implemented in other forms, e.g., as soft keys, on the display 201. In an embodiment, the key input device may include the sensor module disposed on the rear surface 210B of the housing 210.

According to an embodiment, the light emitting device may be disposed on, e.g., the front surface 210A of the housing 210. The light emitting device may provide, e.g., information about the state of the electronic device 101 in the form of light. In an embodiment, the light emitting device may provide a light source that interacts with, e.g., the front camera module 205. The light emitting device may include, e.g., a light emitting diode (LED), an infrared (IR) LED, and/or a xenon lamp.

According to an embodiment, the connector holes 208 and 209 may include, e.g., a first connector hole 208 for accommodating a connector (e.g., a universal serial bus (USB) connector) for transmitting or receiving power and/or data to/from an external electronic device and/or a second connector hole (e.g., an earphone jack) 209 for accommodating a connector for transmitting or receiving audio signals to/from the external electronic device.

According to an embodiment, some of the camera modules 205 and 212 and/or some of the sensor modules may be disposed to be exposed to the outside through at least a portion of the display 201. For example, the camera module 205 may include a punch hole camera disposed inside a hole or recess formed in the rear surface of the display 201. According to an embodiment, the camera module 212 may be disposed inside the housing 210 so that the lens is exposed to the rear surface 210B of the electronic device 101. For example, the camera module 212 may be disposed on a printed circuit board (e.g., the printed circuit board 240 of FIG. 4).

According to an embodiment, the camera module 205 and/or the sensor module may be disposed to contact the external environment through a transparent area from the internal space of the electronic device 101 to the front plate 202 of the display 201. Further, some sensor module may be disposed to perform its functions without being visually exposed through the front plate 202 in the internal space of the electronic device.

Figure 4:
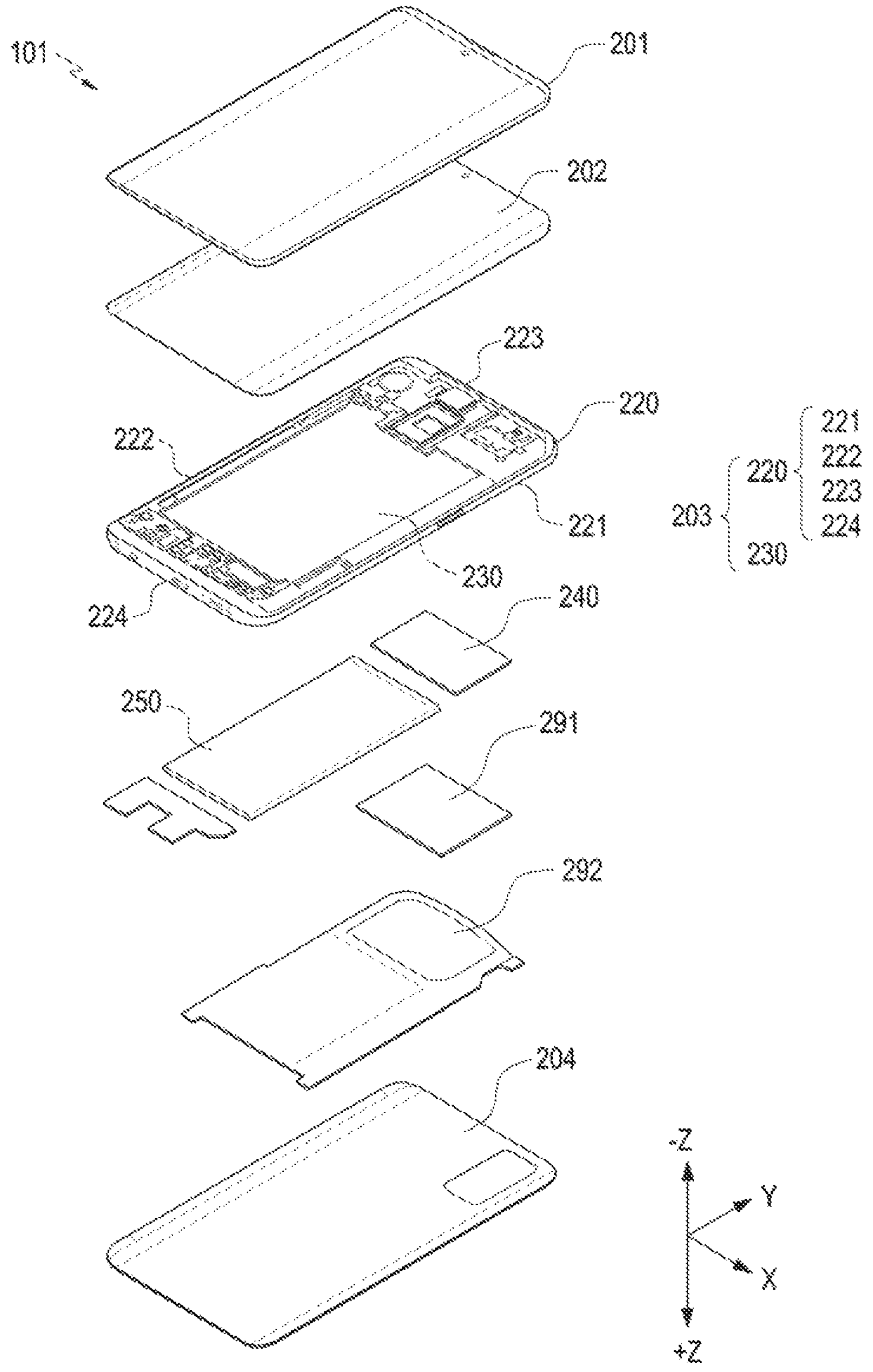
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, according to an embodiment, an electronic device 101 (e.g., the electronic device 101 of FIGS. 1 to 3) may include a supporting bracket 220 and 230, a front plate 202 (e.g., the front plate 202 of FIG. 2), a display module 201 (e.g., the display 201 of FIG. 2), a printed circuit board 240 (e.g., a PCB, flexible PCB (FPCB), or rigid flexible PCB (RFPCB)), a battery 250 (e.g., the battery 189 of FIG. 1), a second supporting member 291 (e.g., a rear structure), an antenna 292 (e.g., the antenna module 197 of FIG. 1), and a rear plate 204 (e.g., the rear cover 211 of FIG. 2). The electronic device 101 may further include a camera module 212 including a camera assembly 212*a* and a camera decorative plate 215, a fixing member 410, and a conductive member 420. The supporting bracket 220 and 230 of the electronic device 101 according to an embodiment may include a side frame 220 (e.g., the side bezel structure 218 of FIG. 2) and a plate 230.

According to an embodiment, the electronic device 101 may omit at least one of the components or may add another component. At least one of the components of the electronic device 101 may be the same or similar to at least one of the components of the electronic device 101 of FIG. 2 or 3 and no duplicate description is made below.

According to an embodiment, the plate 230 may be disposed inside the electronic device 101 to be connected with the side frame 220 or be integrated with the side frame 220. The plate 230 may be formed of, e.g., a metal and/or non-metallic material (e.g., polymer). The display module 201 may be coupled to one surface of the plate 230 and the printed circuit board 240 may be coupled to the opposite surface of the plate 230.

According to an embodiment, a processor, a memory, and/or an interface may be mounted on the printed circuit board 240. The processor may include one or more of, e.g., a central processing unit, an application processor, a graphic processing device, an image signal processing, a sensor hub processor, or a communication processor. According to an embodiment, the printed circuit board 240 may include a flexible printed circuit board type radio frequency cable (FRC). For example, the printed circuit board 240 may be disposed on at least a portion of the plate 230 and may be electrically connected with an antenna 292 (e.g., the antenna module 197 of FIG. 1) and a communication module (e.g., the communication module 190 of FIG. 1).

According to an embodiment, the memory may include, e.g., a volatile or non-volatile memory.

According to an embodiment, the interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the battery 250 may be a device for supplying power to at least one component of the electronic device 101. The battery 250 may include, e.g., a primary cell which is not rechargeable, a secondary cell which is rechargeable, or a fuel cell. At least a portion of the battery 250 may be disposed on substantially the same plane as the printed circuit board 240. The battery 250 may be integrally or detachably disposed inside the electronic device 101.

According to one or more embodiments, the second supporting member 291 (e.g., a rear structure) may be disposed between the printed circuit board 240 and the antenna 292. For example, the second supporting member 291 may include one surface to which at least one of the printed circuit board 240 and the battery 250 is coupled, and another surface to which the antenna is coupled.

According to an embodiment, the antenna 292 may be disposed between the rear plate 204 and the battery 250. The antenna may include, e.g., a near-field communication (NFC) antenna, a wireless charging antenna, and/or a magnetic secure transmission (MST) antenna. The antenna may perform short-range communication with, e.g., an external device or may wirelessly transmit or receive power necessary for charging. According to an embodiment, an antenna 292 may be formed by a portion or combination of the side frame 220 and/or the plate 230. For example, a portion or combination of the side frame 220 and/or the plate 230 may include a conductive portion. The conductive portion may function as a radiator of the antenna 292.

According to an embodiment, the rear plate 204 may form at least a portion of the rear surface (e.g., the second surface 210B of FIG. 3) of the electronic device 101.

Figure 5:
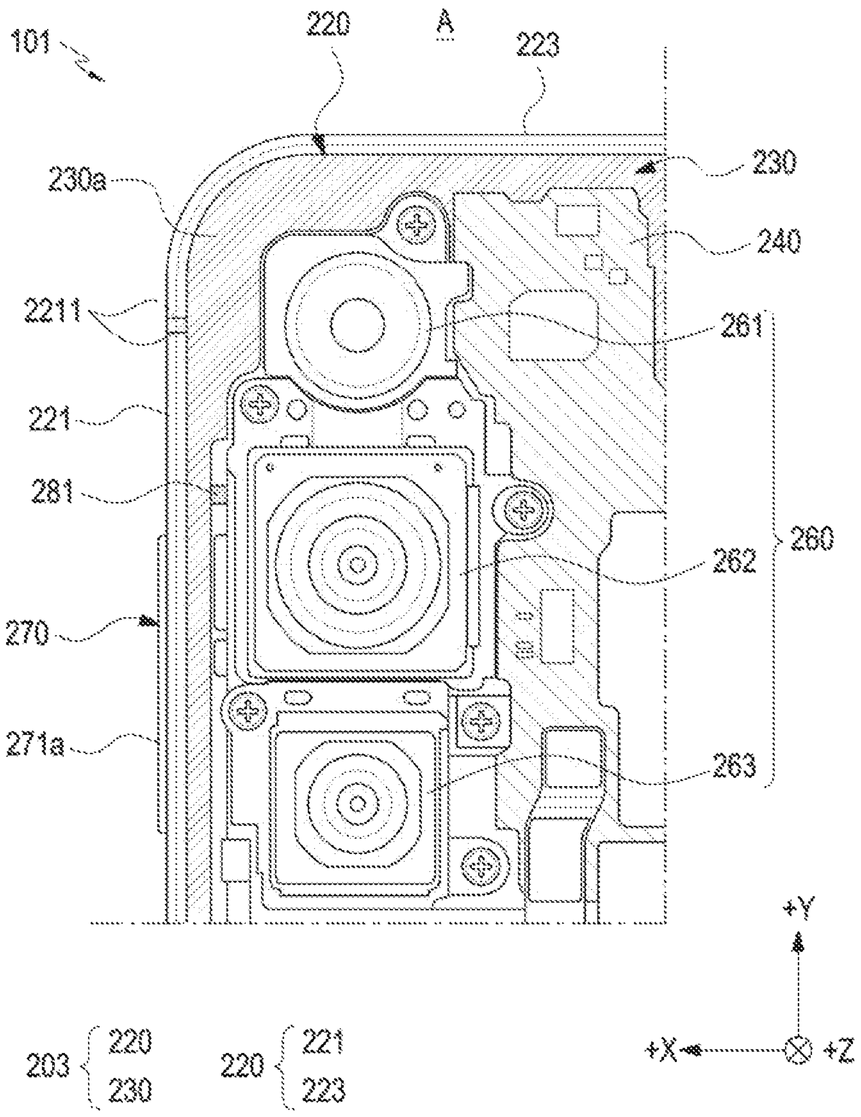
FIG. 5 is a partial cross-sectional view of portion A of FIG. 3 illustrating an electronic device according to an embodiment of the disclosure.
Figure 6:
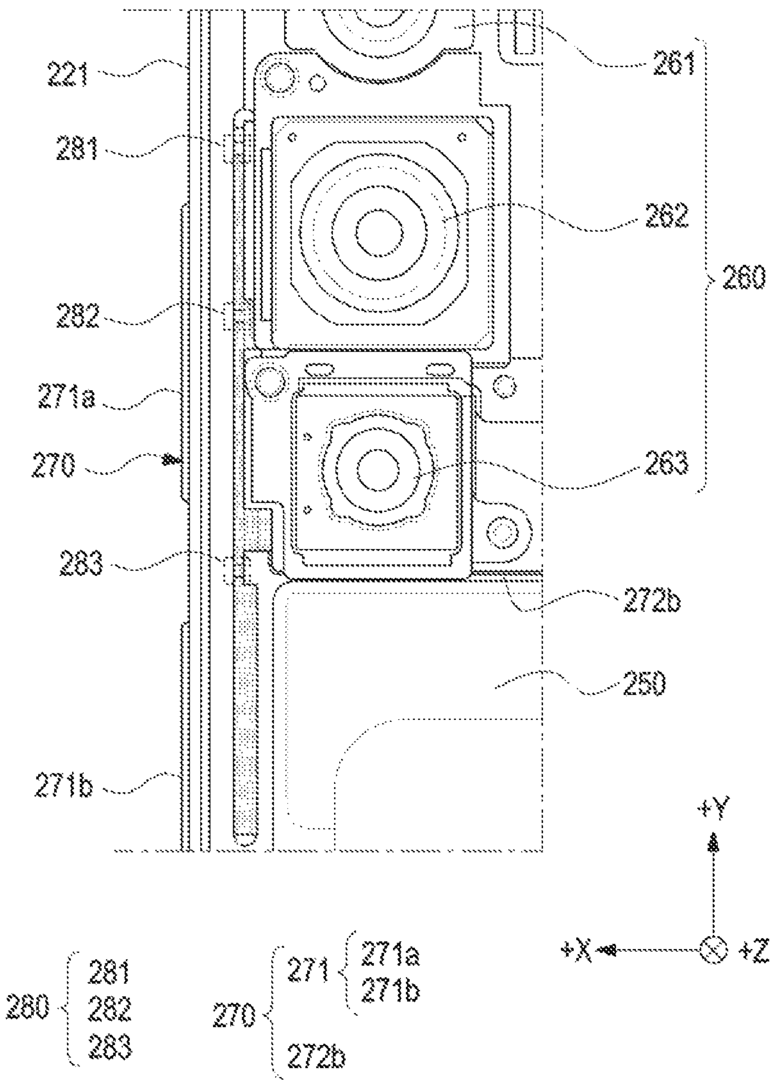
FIG. 6 is a view illustrating an arrangement of some components of a key assembly and an antenna assembly of the electronic device of FIG. 5.
Figure 7:
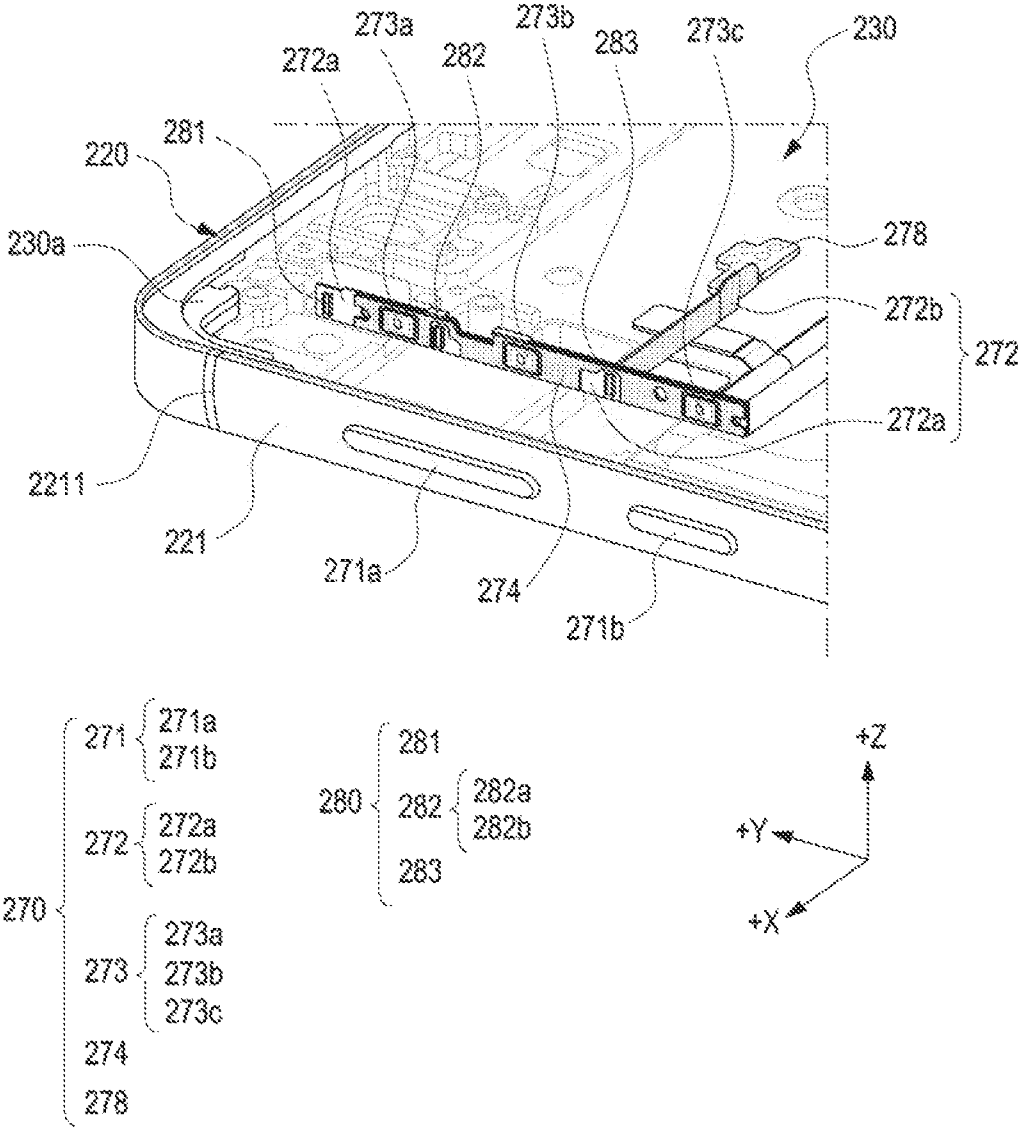
FIG. 7 is a perspective view illustrating some components of the electronic device of FIG. 5.
Figure 8:
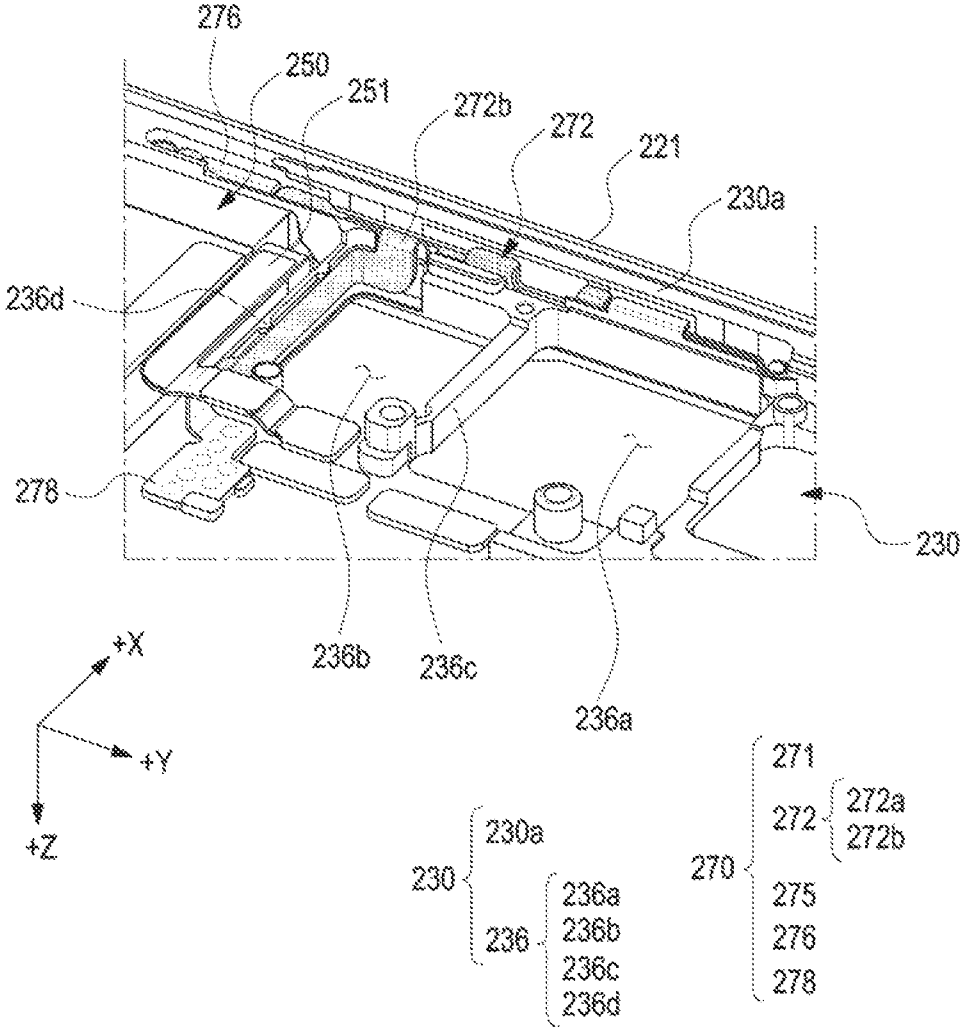
FIG. 8 is a partial perspective view illustrating a portion of an electronic device according to an embodiment of the disclosure.
Figure 9:
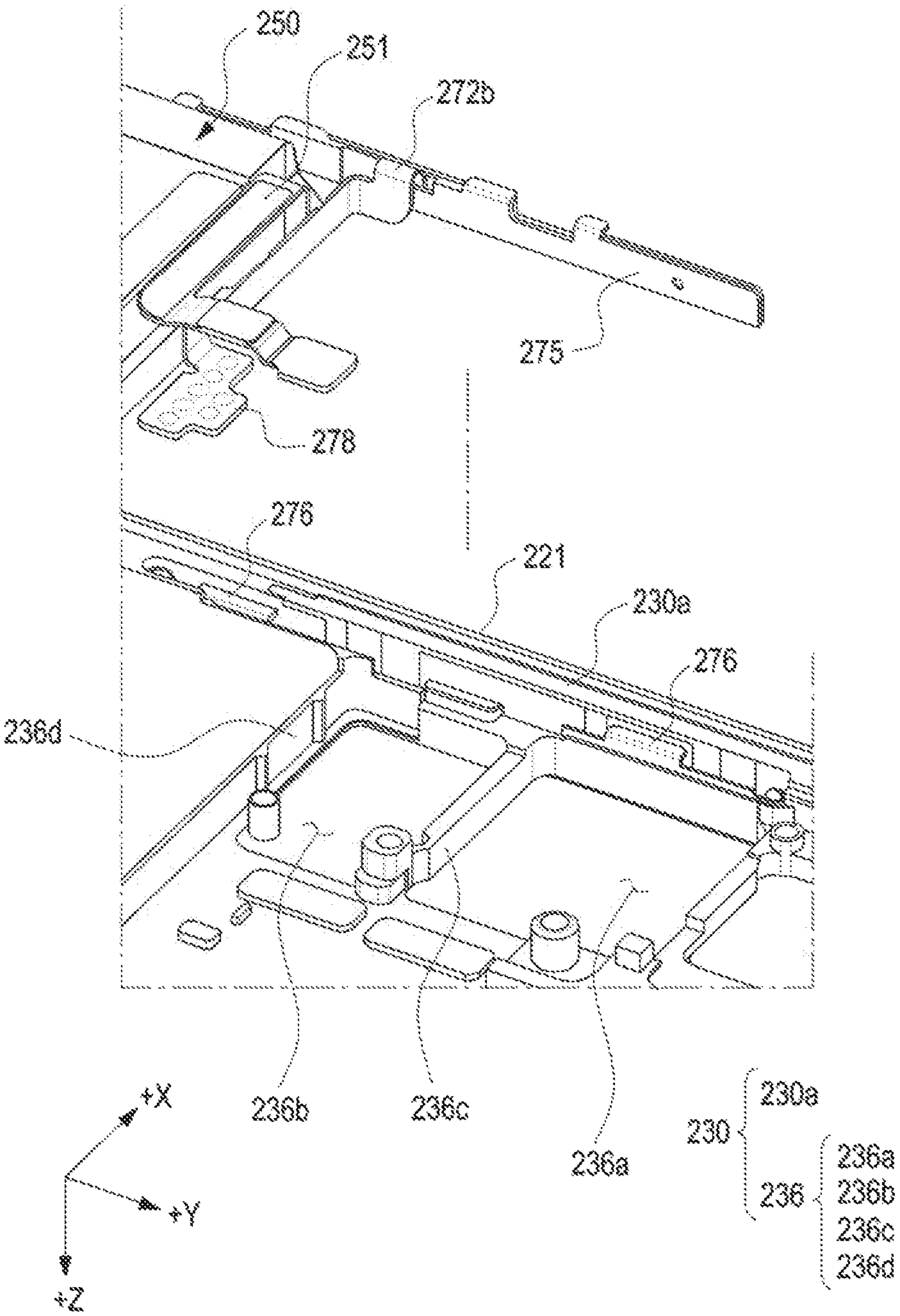
FIG. 9 is an exploded perspective view of FIG. 8 according to an embodiment of the disclosure.

FIG. 5 is a partial cross-sectional view of portion A of FIG. 2 illustrating an electronic device according to an embodiment of the disclosure. FIG. 6 is a view illustrating an arrangement of some components of a key assembly and an antenna assembly of the electronic device of FIG. 5. FIG. 7 is a perspective view illustrating some components of the electronic device of FIG. 5. FIG. 8 is a partial perspective view illustrating a portion of an electronic device according to an embodiment of the disclosure. FIG. 9 is an exploded perspective view of FIG. 8 according to an embodiment of the disclosure.

The configuration of the electronic device 101 of FIG. 5 may be identical or similar in whole or part to the configuration of the electronic device 101 of FIGS. 1 to 4.

Referring to FIGS. 5 to 9, in an embodiment, the electronic device 101 may include a housing 203, a printed circuit board 240, a camera structure 260, a key assembly 270, and/or an antenna assembly 280.

In an embodiment, the housing 203 (e.g., the housing 210 of FIGS. 2 and 3 and/or the rear plate 204 of FIG. 4) may include a plate 230 (e.g., the plate 230 of FIG. 4) and a side frame 220 (e.g., the side frame 220 of FIG. 4).

In an embodiment, the side frame 220 (e.g., the side bezel structure 220 of FIG. 4) may form a side exterior (e.g., the side surface 210C of FIGS. 2 and 3) of the electronic device 101. The side frame 220 may be disposed in a form surrounding at least a portion of an edge of the plate 230. According to an embodiment, the side frame 220 may include a plurality of sidewalls. According to an embodiment, the first sidewall 221 (e.g., the first sidewall 221 of FIG. 4) forms the right frame (e.g., X-direction frame), the left frame (e.g., −X-direction frame), and a second sidewall (e.g., the second sidewall 222 of FIG. 4). For example, the side frame 220 may include a pair of upper and lower sidewalls (e.g., Y-direction sidewalls) that connect the first sidewall 221 and the second sidewall and face each other. According to an embodiment, the side frame 220 may include a third sidewall 223 (e.g., the third sidewall 223 of FIG. 4) forming an upper frame (e.g., a frame in the +Y direction) and a fourth sidewall 224 (e.g., the fourth sidewall 224 of FIG. 4) forming a lower frame (e.g., a frame in the −Y direction) opposite to the third sidewall 223.

According to an embodiment, the side frame 220 (e.g., the first sidewall 221) may at least partially include a conductive (e.g., metal) portion. According to an embodiment, at least a portion of the conductive portion of the side frame 220 may be a radiator of the antenna assembly 280 (e.g., the antenna module 197 of FIG. 1 and/or the antenna 292 of FIG. 4) of the electronic device 101. According to an embodiment, the first sidewall 221 may include a conductive material as a whole. According to an embodiment, the side frame 220 may include a slit area 2211 in which a portion of the first sidewall 221 is missing. For example, the slit area 2211 may be a slit penetrating in the width direction (e.g., the X-axis direction) of the electronic device 101 and extending in the thickness direction (e.g., the Z-axis direction). According to an embodiment, the slit area 2211 may be positioned on one side (e.g., right side or +X direction) of the camera structure 260. According to an embodiment, the slit area 2211 may be disposed to be spaced apart from the key assembly 270 in the length direction of the electronic device 101. For example, the slit area 2211 may be disposed closer to the first sidewall 221 than the key assembly 270. However, the position of the slit area 2211 may be changed according to the position of the camera structure 260, the key assembly 270, and/or the printed circuit board 240. Further, the shape of the slit area 2211 may be changed according to the type and/or configuration of the antenna assembly 280 to be described below, and may be omitted according to an embodiment.

In an embodiment, the plate 230 may be disposed in an inner space surrounded by the front plate (e.g., the front plate 202 of FIG. 4), the rear plate (e.g., the rear plate 204 of FIG. 4), and/or the side frame 220. For example, the plate 230 may be at least partially coupled to or integrally formed with the side frame 220 disposed at an edge thereof. For example, the plate 230 may provide a seating area for an electrical component and/or an electronic component disposed between the front plate (e.g., the front plate 202 of FIG. 4) and the rear plate (e.g., the rear plate 204 of FIG. 4). According to an embodiment, at least a portion of the printed circuit board 240 and the camera structure 260 may be disposed between one surface (e.g., the rear surface or the −Z-direction surface) of the plate 230 and the rear plate (e.g., the rear plate 204 of FIG. 4). According to an embodiment, the plate 230 may include an injection-molded area 230*a* formed in an area (e.g., an edge) contacting the side frame 220. For example, the injection-molded area 230*a* may include a non-conductive material. According to an embodiment, a portion of the injection-molded material of the plate 230 may be disposed in the slit area 2211 of the side frame 220 to be described below. For example, referring to FIG. 7, the surface of the injection-molded product disposed in the slit area 2211, together with the surface of the first sidewall 221, may form a portion of the exterior of the electronic device 101. In an embodiment, at least a portion of the injection-molded area 230*a* may be referred to as a component included in the side frame 220.

Referring to FIGS. 8 and 9, in an embodiment, the plate 230 may include a seating area 236 for accommodating the camera structure 260. For example, the seating area may be a hole through which a partial area of the plate 230 is formed, or may be a recess (or groove) where a partial area of the plate 230 is recessed in an embodiment. For example, there may be provided a plurality of seating areas 236 where a plurality of camera devices of the camera structure 260 are seated, respectively. According to an embodiment, the plate 230 may include a first seating area 236*a*, a second seating area 236*b*, and/or a first partition wall 236*c* formed to block between the first seating area 236*a* and the second seating area 236*b*. According to an embodiment, the plate 230 may include a second partition wall 236*d* formed to block between the area where the first battery 250 is seated and the second seating area 236*b*.

In an embodiment, the camera structure 260 (e.g., the camera module 180 of FIG. 1 and/or the camera modules 205, 212, and 213 of FIGS. 2 and 3) may include a plurality of camera devices. According to an embodiment, at least some of the plurality of camera devices may correspond to rear cameras exposed through the rear plate (e.g., the rear plate 204 of FIG. 4) of the electronic device 101. According to an embodiment, the camera structure 260 may include a first camera device 261, a second camera device 262, and/or a third camera device 263. According to an embodiment, the second camera device 262 may be disposed in the first seating area 236*a*, and the third camera device 263 may be disposed in the second seating area 236*b*. For example, a first partition wall 236*c* may be positioned between the second camera device 262 and the third camera device 263. For example, the camera structure 260 may be electrically connected to the printed circuit board 240, and for example, the camera structure 260 may not be provided with another additional circuit board.

Referring to FIG. 5, the printed circuit board 240 (e.g., the printed circuit board 240 of FIG. 4) may be disposed on one surface (e.g., the rear surface or the −Z-direction surface) of the plate 230. According to an embodiment, the printed circuit board 240 may be spaced apart from the key assembly 270 with the camera structure 260 interposed therebetween. In an embodiment, a communication module (e.g., the communication module 190 of FIG. 1) and/or an antenna module (e.g., the antenna module 197 of FIG. 1) may be disposed on the printed circuit board 240. When a communication module (e.g., the communication module 190 of FIG. 1) and/or an antenna module (e.g., the antenna module 197 of FIG. 1) are disposed on the printed circuit board 240, the electronic device 101 may establish a direct (e.g., wired) communication channel or a wireless communication channel with the external electronic device 101 (e.g., the electronic device 102, the electronic device 104, or the server 108 of FIG. 1) and may support communication through the established communication channel and may exchange signals with each other.

Referring to FIGS. 8 and 9, in an embodiment, the battery 250 (e.g., the battery 250 of FIG. 4) may be disposed on one surface (e.g., the rear surface or the −Z-direction surface) of the plate 230. For example, the battery 250 may be disposed adjacent to the first sidewall 221. For example, a portion of the key assembly 270 may be disposed between the battery 250 and the first sidewall 221. For example, the battery 250 may be closer to the fourth sidewall (e.g., the sidewall in the −Y direction) than the camera structure 260, and may be disposed under the camera structure 260 (e.g., the sidewall in the −Y direction). According to an embodiment, the battery 250 may be electrically connected to the printed circuit board 240 by the second flexible circuit board 251. For example, at least a portion of the second flexible circuit board 251 may be disposed between the battery 250 and the camera structure 260 (e.g., the third camera). For example, the second flexible circuit board 251 may include two surfaces facing each other, and a plurality of signal lines may be disposed between the two surfaces.

Referring to FIGS. 5 to 9, in an embodiment, the key assembly 270 (e.g., the input module 150 of FIG. 1 and/or the key input device 217 of FIGS. 2 and 3) may be disposed inside the side frame 220 (e.g., the first sidewall 221) such that a portion of the key member 271 protrudes to the outside of the side frame 220. For example, the key assembly 270 may be disposed to extend side by side with the first sidewall 221. In the following embodiments, an example in which the key assembly 270 is disposed on the first sidewall 221 will be mainly described, but the placement of the key assembly 270 is not limited to the examples described below.

Referring to FIGS. 7 to 9, in an embodiment, the key assembly 270 may include at least one key member 271, a first flexible circuit board 272, at least one shaft member 273, a key waterproof member 274, and/or a key bracket 275, a key supporting member 276, and/or a key circuit board 278. The following description of the components of the key assembly 270 is merely an example, and some components (e.g., the key member 271 and the shaft member 273) of the key assembly 270 may be changed or omitted depending on the type and function of the key assembly 270.

According to an embodiment, the key member 271 may include a plurality (e.g., two) key members 271*a* and 271*b*. For example, the plurality of key members 271 may include a first key member 271*a* and a second key member 271*b* spaced apart from each other in one direction (e.g., the length direction or the Y-axis direction of the electronic device 101). In an embodiment, each of the first key member 271*a* and the second key member 271*b* may be exposed to the outside of the electronic device 101 through a plurality of openings formed in the first sidewall 221. For example, the first key member 271*a* may correspond to a volume key of the electronic device 101, and the second key member 271*b* may correspond to a power key of the electronic device 101. According to an embodiment, the first key member 271*a* and/or the second key member 271*b* may at least partially include a conductive (e.g., metal) portion. According to an embodiment, the conductive portion of the first key member 271*a* and/or the second key member 271*b* may function as a radiator of at least one antenna assembly 280 (e.g., the antenna module 197 of FIG. 1 and/or the antenna 292 of FIG. 4) of the electronic device 101. For example, the conductive portion of the first key member 271*a* and/or the second key member 271*b* may function as a radiator of the at least one antenna assembly 280 together with the conductive portion of the side frame 220 (e.g., the first sidewall 221).

In an embodiment, the first flexible circuit board 272 may include a first board portion 272*a* facing the key members 271 and a second board portion 272*b* extending from the first board portion 272*a*.

According to an embodiment, the first board portion 272*a* may be disposed in parallel with the first sidewall 221 in a mounting space formed by the first sidewall 221 and/or the plate 230. For example, the first board portion 272*a* may be electrically connected to at least one connection member (e.g., a first connection member 281 and/or a second connection member 283) of the antenna assembly 280. For example, the first board portion 272*a* may include both an analog signal line and a digital signal line (or "second signal line"). According to an embodiment, the second board portion 272*b* may be provided in a form extending between the first board portion 272*a* and the printed circuit board 240. For example, one end of the second board portion 272*b* may be connected to the first board portion 272*a* and the other end thereof may be connected to the printed circuit board 240. In an embodiment, the second board portion 272*b* may include both an analog signal line and a digital signal line. For example, the digital signal line may be electrically connected to a sensor module of the key assembly 270. According to an embodiment, the analog signal line may include at least one feeding signal line (or "first signal line") connected to a portion of the antenna assembly 280. In this disclosure, "feed" or "feeding" may refer to a "power supply".

In an embodiment, the second board portion 272*b* may connect the board assembly (e.g., the first board portion 272*a*) and the printed circuit board 240, and may be disposed so as not to overlap other electrical components in the electronic device 101. Referring to FIG. 6, in an embodiment, at least a portion of the second board portion 272*b* may be disposed between the third camera and the battery 250. For example, the second board portion 272*b* may be disposed to extend from the first board portion 272*a* to the printed circuit board 240 across between the second camera and the third camera.

Referring to FIGS. 8 and 9, in an embodiment, the first flexible circuit board 272 may be disposed not to overlap the second flexible circuit board 251 connected to the battery 250. According to an embodiment, the first flexible circuit board 272 may be fixed to a portion of the second partition wall 236*d* disposed between the battery 250 and the second seating area 236*b*. For example, the second board portion 272*b* may include two surfaces facing each other, and a plurality of signal lines may be disposed side by side in the width direction between the two surfaces. For example, the first flexible circuit board 272 may be fixed such that one surface (e.g., a surface in the −Y direction) of the first flexible circuit board 272 faces a surface (e.g., a surface in the +Y direction) of the second partition wall 236*d* that faces the first partition wall 236*c*. According to an embodiment, the thickness of the first flexible circuit board 272 may cross (e.g., be orthogonal to) one surface of the second flexible circuit board 251. According to an embodiment, the thickness of the first flexible circuit board 272 may not overlap one surface of the second flexible circuit board 251.

As used herein, the phrase "the second board portion 272*b* of the first flexible circuit board 272 and the second flexible circuit board 251 do not overlap" may collectively mean a case in which one surface of the second board portion 272*b* and one surface of the second flexible circuit board 251 do not overlap each other, a case in which a thickness of the first flexible circuit board 272 and one surface of the second flexible circuit board 251 overlap each other, and a case in which one surface of the first flexible circuit board 272 and a thickness of the second flexible circuit board 251 overlap each other. For example, the thickness of the second board portion 272*b* described above may refer to the Y-axis direction dimension of FIGS. 7 to 9 with respect to a portion of the second board portion 272*b* disposed on the second partition wall 236*d*, and the thickness of the second flexible circuit board 251 may refer to the Z-axis direction dimension of FIGS. 7 to 9 with respect to a portion parallel to the second partition wall 236*d*. For example, the width of the second board portion 272*b* described above may refer to the Z-axis direction dimension of FIGS. 7 to 9 with respect to a portion of the second board portion 272*b* disposed on the second partition wall 236*d*.

According to an embodiment of the disclosure, when the second board portion 272*b* is disposed not to overlap another electrical component (e.g., the second flexible circuit board 251), electromagnetic interference that may occur between it and the other electrical component may be suppressed as compared to when the second board portion 272*b* is disposed to overlap the other electrical component (e.g., the second flexible circuit board 251). However, in an embodiment, the placement of the second board portion 272*b* is not limited to the above-described example, and may be changed according to an arrangement relationship with another electrical component such as a flexible circuit board. The placement of the board portion may be applied in various forms to avoid overlap with other electrical components to prevent electromagnetic interference.

According to an embodiment, the shaft member 273 may be disposed on the first board portion 272*a* to protrude toward the key member 271. For example, the shaft member 273 may be configured to receive an external input (e.g., a touch or a pressing force) such as a click applied to the key member 271. For example, the key member 271 may include an elastically deformable material. For example, when an external input (e.g., a pressing force) applied to the key member 271 is transferred to the shaft member 273, the shaft member 273 may be deformed in the pressing direction (e.g., the −X direction). For example, when the pressing force is removed, the shaft member 273 may be restored to its original form to move the key member 271 in a direction (e.g., the +X direction) opposite to the pressing direction, and the key member 271 may be returned to its original position.

According to an embodiment, each shaft member 273 may be electrically connected to the first board portion 272*a* of the first flexible circuit board 272. For example, the key assembly 270 may include a sensor module that detects an external input transferred to the shaft member 273. For example, the sensor module may convert the external input into an electrical signal (e.g., a digital signal). The first board portion 272*a* and/or the second board portion 272*b* may transfer the external input converted into an electrical signal to the key circuit board 278. For example, the key circuit board 278 may be connected to the printed circuit board 240, and may include, e.g., a circuit that processes the electrical signal and transfers the electrical signal to the printed circuit board 240. According to an embodiment, the key circuit board may be omitted, and the second board portion 272*b* may be electrically connected to the printed circuit board 240. For example, the processor disposed on the printed circuit board 240 may detect an electrical signal from the second board portion 272*b* and/or the key circuit board.

According to an embodiment, a plurality (e.g., three) of shaft members 273 may be provided. According to an embodiment, the plurality of shaft members 273 may be disposed on the key bracket 275 to be spaced apart from each other in one axial direction (e.g., in the length direction or the Y-axis direction of the electronic device 101). For example, the shaft members 273 may include a first shaft member 273*a*, a second shaft member 273*b*, and a third shaft member 273*c*. For example, the first shaft member 273*a*, the second shaft member 273*b*, and the third shaft member 273*c* may be sequentially disposed along the first sidewall 221 from the upward direction (+Y direction). For example, the at least one shaft member 273 may overlap the one key member 271, e.g., in one axis (e.g., the width direction or the X axis direction of the electronic device 101). According to an embodiment, the first shaft member 273*a* and the second shaft member 273*b* may overlap and be connected to different areas of the first key member 271*a*. For example, the first shaft member 273*a* may be activated when a portion of the first key member 271*a* overlapping the first shaft member 273*a* is pressed, and the second shaft member 273*b* may be activated when another partial area of the first key member 271*a* overlapping the second shaft member 273*b* is pressed. For example, the third shaft member 273*c* may be connected to the second key member 271*b*, and when the second key member 271*b* is pressed, the third shaft member 273*c* may be activated.

According to an embodiment, the key waterproof member 274 may be disposed on one surface (e.g., a surface in the +X direction) facing the key member 271 of the first board portion 272*a*. For example, the key waterproof member 274 may be opened in areas overlapping the key shaft member 273. The key shaft member 273 may be disposed to protrude toward the key member 271 through the opening of the key waterproof member 274. According to an embodiment, the key bracket 275 may be disposed on another surface (e.g., the surface in the −X direction) of the first board portion 272*a* that faces the key waterproof member 274. For example, the key bracket 275 may support and/or protect the first board portion 272*a*. According to an embodiment, some components (e.g., the key waterproof member 274 and/or the key bracket 275) may be omitted.

According to an embodiment, the key supporting member 276 may be disposed farther from the first sidewall 221 than other components of the key assembly 270. For example, the key member 271 may be disposed between the printed circuit board 240 or the key supporting member 276 and the camera structure 260. For example, the key supporting member 276 may be formed to be elastically deformable. For example, when the shaft member 273 overlapping the key member 271 is deformed and/or moved in the pressing direction (e.g., the −X-axis direction) due to the external input (e.g., a pressing force) applied to the key member 271, the key supporting member 276 may also be displaced and/or elastically deformed in the pressing direction. For example, when the pressing force is removed, the key supporting member 276 may return to its original form and move and/or deform the key waterproof member 274 and/or the key bracket 275, including the first flexible circuit board 272 disposed on one side (e.g., the +X direction), to its original position in a direction (e.g., the +X direction) opposite to the pressing direction. According to an embodiment, the shape and/or position of the key supporting member 276 may be changed or omitted.

In an embodiment of the disclosure, various communication methods, such as 2/3/4G communication, Bluetooth, Wi-Fi, and/or ultra-wide band (UWB) as well as short-range communication such as near field communication (NFC), magnetic secure transmission (MST), and wireless charging, may be performed by utilizing the conductive portion of the side frame 220 as an antenna radiator.

Referring to FIGS. 5 to 7, in an embodiment, the antenna assembly 280 may be disposed along a portion of the first sidewall 221. In an embodiment, the antenna assembly 280 may include at least one conductive portion of the first sidewall 221, a plurality of connection members 281, 282, and 283, and a feeding signal line disposed on the first flexible circuit board 272. According to an embodiment, the conductive portion may be electrically connected to the first connection member 281 and/or the second connection member 283 connected to the feeding signal line to function as an antenna radiator.

In an embodiment, the antenna assembly 280 may include a first connection member 281, a second connection member 283, and/or a third connection member 282 disposed between the first connection member 281 and the second connection member 283, which are spaced apart from each other along the first sidewall 221. Each of the connection members 281, 282, and 283 may be electrically connected to a conductive portion of the first sidewall 221. For example, the first connection member 281 and/or the second connection member 283 may be connected to a feeding signal line disposed on the first flexible circuit board 272. For example, the third connection member 282 may be electrically connected to a ground area disposed on the printed circuit board 240. For example, the connection members 281, 282, and 283 may be electrically connected to conductive portions, respectively, disposed in different areas on the first sidewall 221. For example, the connection members 281, 282, and 283 may include a conductive material such as metal, and may be, e.g., a clip member (e.g., C-clip).

Figure 10:
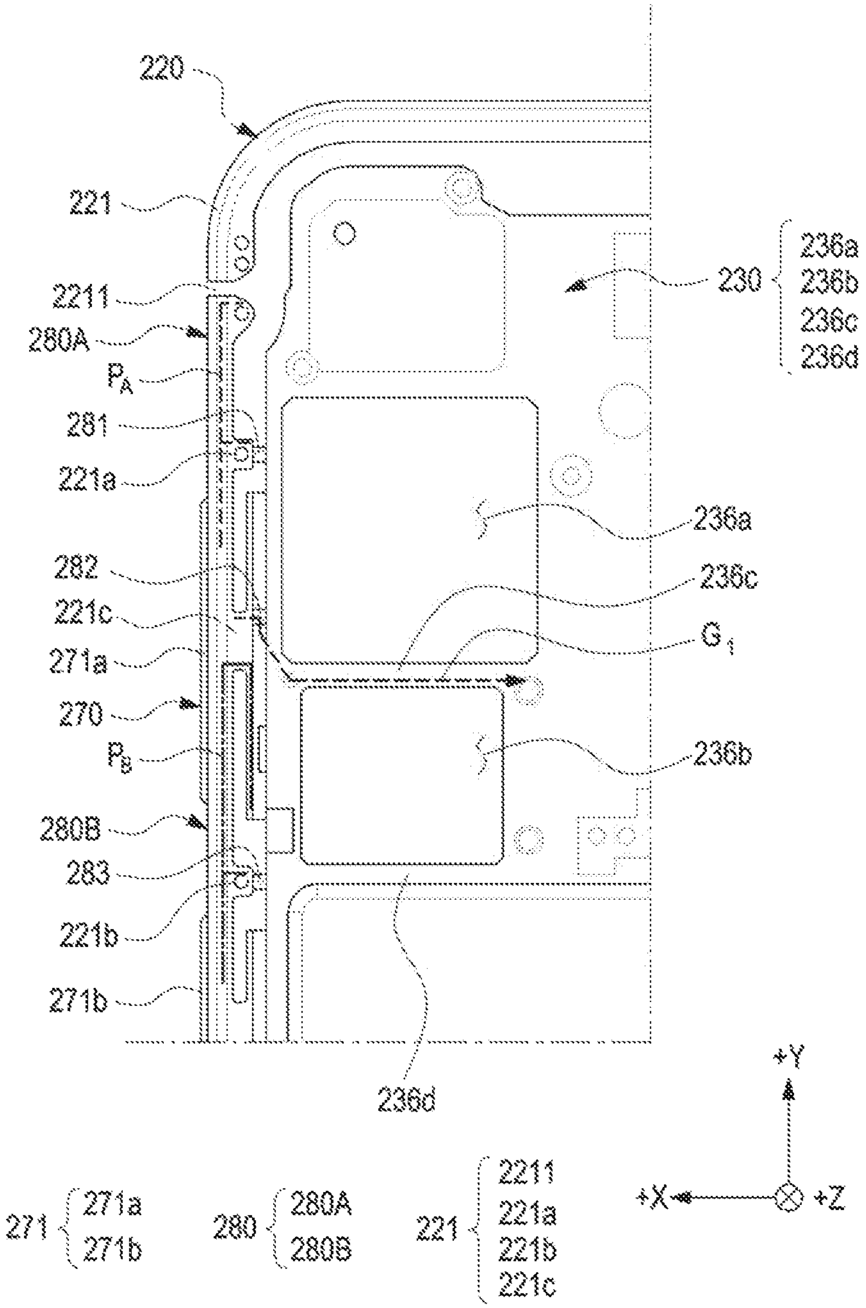
FIG. 10 is a view illustrating an antenna assembly of an electronic device according to an embodiment of the disclosure.
Figure 11:
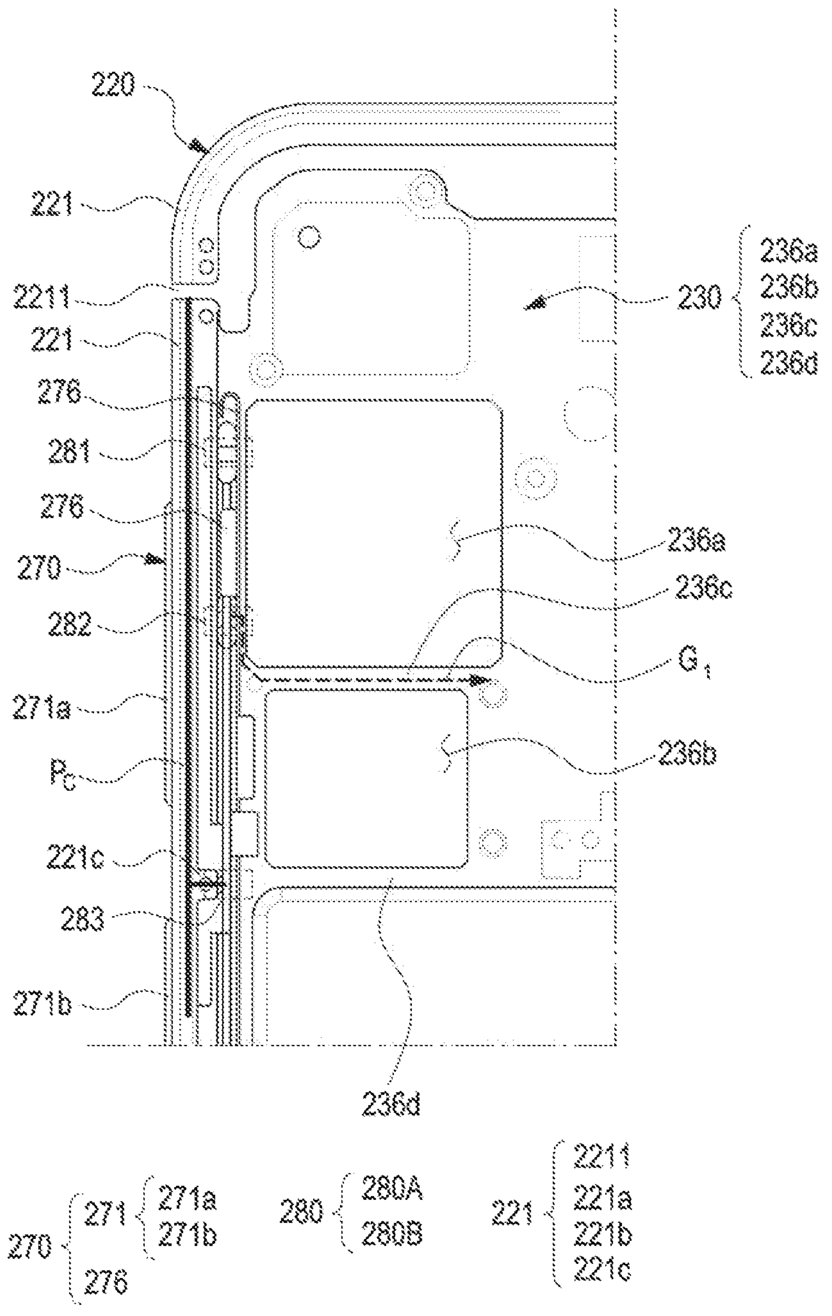
FIG. 11 is a view illustrating an antenna assembly of an electronic device according to an embodiment of the disclosure.

Hereinafter, a configuration of the antenna assembly 280 is described in greater detail with reference to FIGS. 10 and 11. FIG. 10 is a view illustrating an antenna assembly of an electronic device according to an embodiment of the disclosure. FIG. 11 is a view illustrating an antenna assembly of an electronic device according to an embodiment of the disclosure.

Referring to FIGS. 10 and 11, according to an embodiment, the first sidewall 221 may further include at least one extension member 221*a*, 221*b*, and 221*c* protruding toward the first board portion 272*a* (e.g., in the −X direction). The extension member may include a conductive material (e.g., metal). According to an embodiment, at least some of the extension members (e.g., the extension members of FIGS. 10 and 11) may be electrically connected to the connection members 281, 282, and 283 receiving the feeding signal among the connection members 281, 282, and 283 of the antenna assembly 280. According to an embodiment, at least some of the extension members 221*a*, 221*b*, and 221*c* may be electrically connected to connection members (e.g., the first connection member 281 and the second connection member 283) grounded to the printed circuit board 240 among the connection members 281, 282, and 283 of the antenna assembly 280.

Referring to FIG. 10, in an embodiment, the antenna assembly 280 may include a first antenna module 280A and a second antenna module 280B. According to an embodiment, the first connection member 281 and the second connection member 283 may correspond to feeding members respectively connected to feeding signal lines of the first flexible circuit board 272. The third connection member 282 may be electrically connected to a ground area of the printed circuit board 240. Referring to FIG. 10, in an embodiment, a plurality (e.g., three) of extension members 221*a*, 221*b*, and 221*c* may be provided. For example, the plurality of extension members 221*a*, 221*b*, and 221*c* may include a first extension member 221*a* electrically connected to the first connection member 281, a second extension member 221*b* electrically connected to the second connection member 283, and/or a third extension member 221*c* electrically connected to the third connection member 282.

Referring to FIG. 10, according to an embodiment, the first antenna module 280A may include a first connection member 281 that is a feeding member, and a conductive portion of the first sidewall 221 electrically connected to the first connection member 281. For example, the conductive portion functioning as the radiator of the first antenna module 280A may be referred to as a first conductive portion. According to an embodiment, the first antenna module 280A may include a first antenna pattern $P_A$ formed on the first conductive portion. For example, the first antenna module 280A may radiate a frequency signal in a first designated range by an electrical path of the first antenna pattern $P_A$. The first antenna module 280A may transmit and/or receive a frequency signal in the first designated range to and/or from the external electronic device 101 (e.g., the electronic device 102 or the electronic device 104 of FIG. 1). According to an embodiment, the first antenna pattern $P_A$ may be formed between the slit area 2211 of the first sidewall 221 and the third connection member 282. According to an embodiment, the first antenna module 280A may operate as a slit antenna. For example, the length of the first antenna pattern $P_A$ may be about ¼ of the wavelength λ of the first antenna module 280A.

Referring to FIG. 10, according to an embodiment, the first antenna module 280A may include a second connection member 283 that is a feeding member, and a conductive portion of the first sidewall 221 electrically connected to the second connection member 283. For example, the conductive portion functioning as the radiator of the second antenna module 280B may be referred to as a second conductive portion. For example, the second conductive portion of the second antenna module 280B may be formed in different areas separated with respect to the first conductive portion of the first antenna module 280A and the third connection member 282.

According to an embodiment, the second antenna module 280B may include a second antenna pattern $P_B$ formed on the second conductive portion. For example, the second antenna module 280B may radiate a frequency signal in a second designated range through an electrical path of the second antenna pattern $P_B$. The second antenna module 280B may transmit and/or receive the frequency signal in the second designated range to/from the external electronic device 101 (e.g., the electronic device 102 or the electronic device 104 of FIG. 1). For example, the first designated range of the first antenna module 280A and the second designated range of the second antenna module 280B may be different from each other, or may at least partially overlap each other. According to an embodiment, the first antenna module 280A may operate as a slot antenna. For example, the length of the first antenna pattern $P_A$ may be about ½ of the wavelength 2 of the second antenna module 280B.

Referring to FIG. 10, the third connection member 282 may be disposed between the first antenna module 280A and the second antenna module 280B. According to an embodiment, the third connection member 282 may be connected to the ground area of the printed circuit board 240 through an electrical path indicated by Gi in FIG. 10. For example, the electrical path Gi may be formed along the first partition wall 236*c* of the plate 230. The third connection member 282 may enhance isolation between the first antenna module 280A and the second antenna module 280B. For example, in the first antenna module 280A and the second antenna module 280B using conductive portions of different areas of the first sidewall 221 as radiators, the respective frequency signals may affect each other. According to an embodiment of the disclosure, the third connection member 282, which is a ground member, is disposed between the first antenna module 280A and the second antenna module 280B, and the first antenna module 280A and the second antenna module 280B are grounded differently from each other, thereby suppressing interference between the two antenna modules 280A and 280B and enhancing isolation.

Referring to FIG. 11, in an embodiment, the antenna assembly 280 may function as a single antenna module.

The following description focuses primarily on differences of the embodiment of FIG. 11 from the embodiment of FIG. 10, with common features omitted from the description.

Referring to FIG. 11, in an embodiment, the antenna assembly 280 may include a third extension member 221*c* which is a single member. For example, the third extension member 221*c* may be electrically connected to the third connection member 282. Referring to FIG. 11, according to an embodiment, the antenna assembly 280 may include a third connection member 282, which is a feeding member, and a conductive portion of a third sidewall electrically connected to the third connection member 282. According to an embodiment, the second connection member 283 may correspond to a feeding member connected to a feeding signal line of the first flexible circuit board 272. The third connection member 282 may be electrically connected to a ground area of the printed circuit board 240. The first connection member 281 may be connected to the third connection member 282 at one point (e.g., CCP) and may be grounded to the printed circuit board 240 through the third connection member 282. According to the embodiment illustrated in FIG. 11, the antenna assembly 280 may electrically connect the conductive portion to the ground area through the plurality of connection members 281 and 283, thereby providing stable antenna performance as compared to the case of grounding through one connection member (e.g., the third connection member 282).

According to an embodiment, the antenna assembly 280 may include a third antenna pattern Pc formed on the conductive portion. For example, the antenna assembly 280 may radiate a frequency signal in a third designated range by an electrical path of the third antenna pattern Pc. For example, the third designated range may differ from, or may at least partially overlap, the first designated range and/or the second designated range of the embodiment of FIG. 10. The antenna assembly 280 may transmit and/or receive a frequency signal in the third designated range to/from the external electronic device 101 (e.g., the electronic device 102 or the electronic device 104 of FIG. 1). According to an embodiment, the third antenna pattern Pc may be formed on the first sidewall 221 between a partial area adjacent to the slit area 2211 and a partial area positioned lower than the second connection member 283 (e.g., in the −Y direction). According to an embodiment, the antenna assembly 280 of FIG. 11 may operate as a slit antenna.

Figure 12:
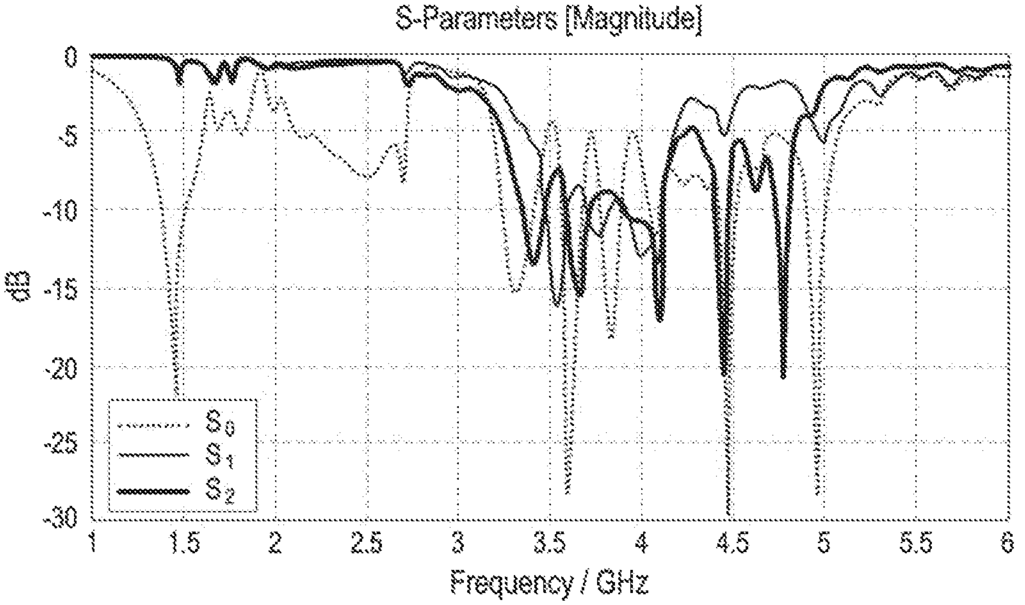
FIG. 12 is a graph illustrating radiation performance of an antenna assembly of an electronic device according to an embodiment of the disclosure.
Figure 13:
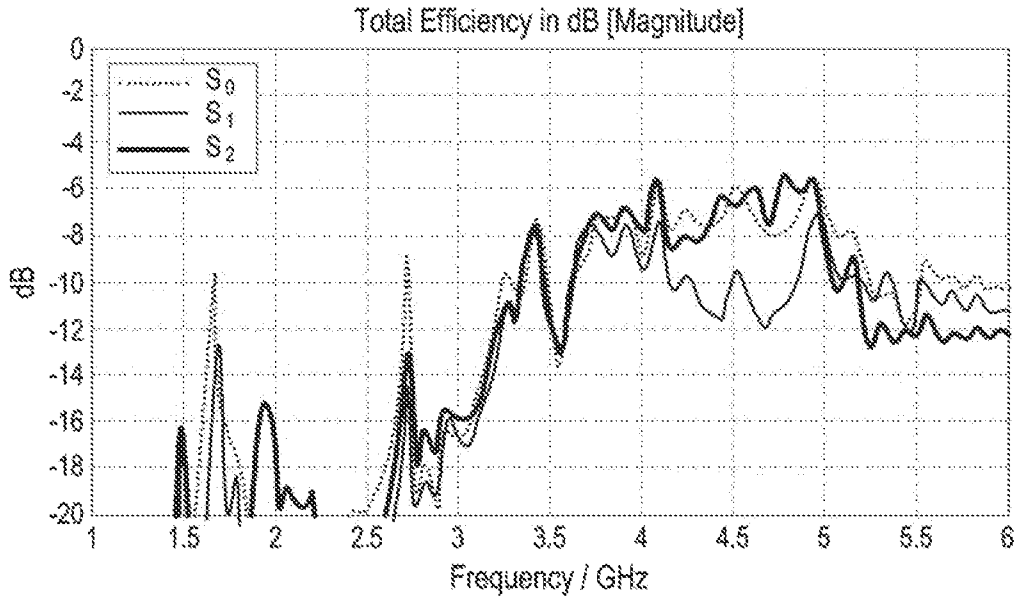
FIG. 13 is a graph illustrating radiation performance of an antenna assembly of an electronic device according to an embodiment of the disclosure.

FIG. 12 is a graph illustrating radiation performance of an antenna assembly of an electronic device according to an embodiment of the disclosure. FIG. 13 is a graph illustrating radiation performance of an antenna assembly 280 of an electronic device 101 according to an embodiment of the disclosure. The x-axis of FIGS. 12 and 13 may represent a frequency band (frequency/GHz), and the y-axis may represent the performance of the antenna (the strength dB of the received signal).

Graph S0 of FIGS. 12 and 13 may represent antenna performance when the third connection member 282, which is a ground member, is not disposed between the first antenna module 280A and the second antenna module 280B. Graphs S1 and S2 of FIGS. 12 and 13, respectively, may represent when the third connection member 282 is not electrically connected to a ground area corresponding to the main ground of the printed circuit board 240 and when the third connection member 282 is connected to the ground area in a case where the third connection member 282, which is a ground member, is disposed between the first antenna module 280A and the second antenna module 280B. For example, graph S2 may represent the performance of the antenna assembly 280 according to an embodiment described above with reference to FIGS. 4 to 10. Referring to FIGS. 12 and 13, according to an embodiment, when the third connection member 282, which is a ground member, is disposed between the first antenna module 280A and the second antenna module 280B (graphs S1 and S2), it may be identified that antenna performance is stabilized in a designated frequency range (e.g., about 3.3 GHz to about 4.2 GHz) as compared to when the third connection member 282 is not disposed (graph S0).

An electronic device may include a housing including a conductive material such as metal. For example, the housing may include a sidewall (or a side frame) on which a side key assembly is disposed. In this case, a portion (hereinafter, referred to as a "side radiator") of the sidewall adjacent to the side key assembly may be utilized as an antenna radiator. When the conductive sidewall is used as a radiator, isotropic characteristics may be enhanced as compared to a laser direct structuring (LDS) antenna, leading to better communication performance. However, when a structure or an electronic component (e.g., a camera module) that does not have a separate circuit board is disposed between the side key assembly and the main circuit board, the feeding signal line of the side radiator may be provided to extend to the main circuit board. However, since the feeding signal line includes an analog signal line, electromagnetic interference may occur when the feeding signal line is disposed to overlap another electrical component (e.g., a flexible circuit board of a side key assembly) including the digital signal line.

Aspects of the disclosure are to address at least the above-described problems and/or disadvantages, and to provide at least the advantages described below. An antenna assembly according to an embodiment of the disclosure is to use a portion of a conductive sidewall as an antenna radiator. In particular, there are provided an antenna assembly that suppresses electromagnetic interference by placing a feeding signal line of an antenna radiator extending to the main circuit board not to overlap another electrical component including a digital, signal line when the other electrical component is disposed between it and the main circuit board and an electronic device including the antenna assembly. According to an embodiment of the disclosure, an antenna structure may be formed by utilizing an existing electrical component, e.g., in a method of including a signal line for feeding an antenna radiator of a sidewall in a flexible circuit board of a side key assembly.

According to an embodiment of the disclosure, there are provided an antenna assembly that prevents deterioration of radiation performance and provides enhanced communication quality by reducing interference between two antenna modules by forming an electrical path connecting the antenna modules with the ground area of the printed circuit board and disposed between the two antenna modules spaced apart from each other along the side frame and an electronic device including the antenna assembly.

Effects of the disclosure are not limited to the foregoing, and other unmentioned effects would be apparent to one of ordinary skill in the art from the following description.

An electronic device 101 according to an embodiment of the disclosure may include a plate 230, a side frame 220, a printed circuit board 240, a key assembly 270, and/or at least one antenna module 280; 280A; 280B. The side frame may disposed at an edge of the plate and include a first sidewall. The first sidewall may extend in at least one axial direction and including at least one conductive portion. The printed circuit board may be disposed on one surface of the plate and may include at least one ground area. The key assembly may be disposed on a portion of the side frame and may include a first flexible circuit board connected to the printed circuit board. The antenna module may include the at least one conductive portion and a plurality of connection members. The plurality of connection members may include a first connection member 281 disposed inside the first sidewall, a second connection member 283 disposed inside the first sidewall to be spaced apart from the first connection member and a third connection member 282 disposed between the first connection member and the second connection member. Each of the first connection member and the second connection may be electrically connected to at least one conductive portion and the first flexible circuit board. The third connection member may be electrically connected to at least one the conductive portion and the ground area.

In an embodiment, the antenna module may include at least one first signal line accommodated in the first flexible circuit board and configured to transmit a feeding signal. The at least one first signal line may be electrically connected to at least one of the first connection member or the second connection member.

In an embodiment, the first flexible circuit board may include at least one second signal line configured to transmit a digital signal and electrically connecting the key assembly and the printed circuit board.

In an embodiment, the electronic device may include at least one electrical component disposed on the one surface of the plate. The first flexible circuit board may not overlap the electrical component.

In an embodiment, the electrical component may include a battery 250 and at least one second flexible circuit board 251 configured to connect the battery and the printed circuit board.

In an embodiment, at least one first signal line may include a plurality of the first signal lines connected to the first connection member and the second connection member. The antenna module may include a first antenna module 280A electrically connected to the first connection member and/or a second antenna module 280B spaced apart from the first antenna module along the first sidewall with the third connection member interposed therebetween and electrically connected to the second connection member.

In an embodiment, the first antenna module may include the first connection member; and a first conductive portion of the at least one conductive portion, the first conductive portion configured to receive a feeding signal from the first connection member. The second antenna module may include the second connection member; and a second conductive portion of the at least one conductive portion, the second conductive portion configured to receive a feeding signal from the second connection member. The first conductive portion may be formed on a portion of the first sidewall. The second conductive portion may be formed on another portion of the first sidewall spaced apart from the first conductive portion with the third connection member interposed therebetween.

In an embodiment, the first antenna module may be grounded to the third connection member through an electrical path formed between the first connection member and the third connection member. The second antenna module may be grounded to the third connection member through an electrical path formed between the second connection member and the third connection member.

In an embodiment, the first sidewall may include a slit area 2211 formed through an area of the first sidewall adjacent to the first connection member. The first connection member is disposed between the slit area and the third connection member. The first antenna module may be a slit antenna.

In an embodiment, the second antenna module may be a slot antenna.

In an embodiment, the key assembly may include at least one key member 271, 271*a*, and 271*b* at least partially visually exposed to an outside of the electronic device through an opening formed in a portion of the first sidewall. The key assembly may include at least one shaft member 273; 273*a*, 273*b*, and 273*c* disposed inside the first sidewall to receive an external input applied to the key member. The key assembly may include a sensor module disposed inside the first sidewall to detect an external input transmitted from the shaft member. The first flexible circuit board includes at least one second signal line configured to transmit a digital signal and electrically connected to the sensor module.

In an embodiment, the first sidewall may include a plurality of extension members 221*a*, 221*b*, and 221*c* protruding toward the first connection member, the second connection member, and the third connection member. The extension members may be electrically connected to the first connection member, the second connection member, and the second connection member.

In an embodiment, the extension members may be electrically connected to the at least one conductive portion of the first sidewall.

In an embodiment, the first flexible circuit board may include a first board portion 272*a* where at least some of the first connection member, the second connection member, or the third connection member are disposed on one surface of the first board portion facing the first sidewall. The first flexible circuit board may include a second board portion 272*b* connecting the first board portion and the printed circuit board.

In an embodiment, the electronic device may include an electronic component disposed between the first sidewall and the printed circuit board. At least a portion of the second board portion may be disposed on the battery and the electronic component.

An electronic device according to an embodiment of the disclosure may include a plate 230, a side frame 220, a printed circuit board 240, a key assembly 270, and/or an antenna assembly 280. The side frame may include a first sidewall 221 disposed at an edge of the plate, extending in at least one axial direction, and including at least one conductive portion. The printed circuit board may be disposed on one surface of the plate and may include at least one ground area. The key assembly may be disposed on a portion of the side frame and may include a first flexible circuit board 272 connected to the printed circuit board. The antenna assembly may include a first connection member 281 disposed inside the first sidewall, a second connection member 283 disposed inside the first sidewall to be spaced apart from the first connection member and a third connection member 282 disposed between the first connection member and the second connection member. Each of the first connection member, the second connection and the third connection member may be electrically connected to at least one conductive portion. The second connection member 283 may be electrically connected to the first flexible circuit board. The third connection member 282 may be electrically connected to the ground area.

In an embodiment, the antenna assembly may at least one first signal line accommodated in the first flexible circuit board and configured to transmit a feeding signal. The at least one first signal line may be electrically connected to at least one of the first connection member or the second connection member.

In an embodiment, the first flexible circuit board may include at least one second signal line configured to transmit a digital signal and electrically connecting the key assembly and the printed circuit board.

In an embodiment, the first connection member may be connected to the second connection member at one point through a first electrical path. The second connection member may be connected to the ground area through a second electrical path from the one point.

In an embodiment, the first sidewall may include a slit area 2211 formed through an area of the first sidewall adjacent to the first connection member. The first connection member may be disposed between the slit area and the third connection member. The antenna assembly may be a slit antenna.

An electronic device 101 according to an embodiment of the disclosure may comprise a frame comprising at least one conductive portion, a printed circuit board within the frame and comprising at least one ground area, a key assembly on a portion of the frame and comprising a first flexible circuit board connected to the printed circuit board and a plurality of antenna modules. The plurality of antenna modules may comprise the at least one conductive portion, a first connection member inside the frame, the first connection member being electrically connected to the at least one conductive portion and the first flexible circuit board, a second connection member inside the frame and spaced apart from the first connection member, the second connection member being electrically connected to the at least one conductive portion and the first flexible circuit board, a third connection member between the first connection member and the second connection member, the third connection member being electrically connected to the at least one the at least one conductive portion and the at least one ground area, a first antenna module electrically connected to the first connection member and a second antenna module spaced apart from the first antenna module along the frame with the third connection member interposed therebetween, the second antenna module being electrically connected to the second connection member.

While the disclosure has been illustrated and described with reference to one or more embodiments thereof, it will be understood by those skilled in the art that various changes in form and details may be made thereto without departing from the spirit and scope of the disclosure as defined by the appended claims and their equivalents.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising: a plate; a side frame provided at an edge of the plate, the side frame comprising a first sidewall extending in at least one axial direction and comprising at least one conductive portion; a printed circuit board provided on a surface of the plate and comprising at least one ground area; a key assembly provided on the side frame and comprising a first flexible circuit board connected to the printed circuit board; and at least one antenna module comprising: the at least one conductive portion; a first connection member provided inside the first sidewall, the first connection member being electrically connected to the first flexible circuit board and at least one of the at least one conductive portion; a second connection member provided inside the first sidewall and spaced apart from the first connection member, the second connection member being electrically connected to the first flexible circuit board and at least one of the at least one conductive portion; and a third connection member between the first connection member and the second connection member, the third connection member being electrically connected to the at least one ground area and at least one of the at least one conductive portion.

2. The electronic device of claim 1, wherein the at least one antenna module further comprises at least one first signal line accommodated in the first flexible circuit board and configured to transmit a feeding signal, and wherein the at least one first signal line is electrically connected to at least one of the first connection member or the second connection member.

3. The electronic device of claim 2, wherein the first flexible circuit board comprises at least one second signal line configured to transmit a digital signal and electrically connecting the key assembly and the printed circuit board.

4. The electronic device of claim 3, further comprising at least one electrical component disposed on the surface of the plate, wherein the first flexible circuit board does not overlap the at least one electrical component.

5. The electronic device of claim 4, wherein the at least one electrical component comprises:

a battery; and at least one second flexible circuit board configured to connect the battery and the printed circuit board.

6. The electronic device of claim 2, wherein the at least one first signal line comprises a plurality of first signal lines connected to the first connection member and the second connection member, wherein the at least one antenna module comprises a plurality of antenna modules; and wherein the plurality of antenna modules comprise:

a first antenna module electrically connected to the first connection member; and a second antenna module spaced apart from the first antenna module along the first sidewall with the third connection member interposed therebetween and electrically connected to the second connection member.

7. The electronic device of claim 6, wherein the first antenna module comprises the first connection member and a first conductive portion of the at least one conductive portion, the first conductive portion being configured to receive a feeding signal from the first connection member, wherein the second antenna module comprises the second connection member and a second conductive portion of the at least one conductive portion, the second conductive portion being configured to receive a feeding signal from the second connection member, and wherein the first conductive portion is provided on a portion of the first sidewall, and the second conductive portion is provided on another portion of the first sidewall spaced apart from the first conductive portion with the third connection member interposed therebetween.

8. The electronic device of claim 6, wherein the first antenna module is grounded to the third connection member through an electrical path formed between the first connection member and the third connection member, and wherein the second antenna module is grounded to the third connection member through an electrical path formed between the second connection member and the third connection member.

9. The electronic device of claim 6, wherein the first sidewall further comprises a slit area adjacent to the first connection member, wherein the first connection member is provided between the slit area and the third connection member, and wherein the first antenna module is a slit antenna.

10. The electronic device of claim 6, wherein the second antenna module is a slot antenna.

11. The electronic device of claim 2, wherein the key assembly further comprises:

at least one key member at least partially visually exposed to an outside of the electronic device through an opening in a portion of the first sidewall;

at least one shaft member inside the first sidewall and configured to receive an external input applied to the at least one key member; and a sensor module inside the first sidewall and configured to detect the external input transferred from the at least one shaft member, and wherein the first flexible circuit board includes at least one second signal line configured to transmit a digital signal and electrically connected to the sensor module.

12. The electronic device of claim 1, wherein the first sidewall further comprises a plurality of extension members protruding toward the first connection member, the second connection member, and the third connection member, and wherein the plurality of extension members are electrically connected to the first connection member, the second connection member, and the third connection member.

13. The electronic device of claim 12, wherein the plurality of extension members are electrically connected to the at least one conductive portion of the first sidewall.

14. The electronic device of claim 1, wherein the first flexible circuit board comprises:

a first board portion comprising a surface facing the first sidewall and on which at least one of the first connection member, the second connection member, or the third connection member is disposed; and a second board portion connecting the first board portion and the printed circuit board.

15. The electronic device of claim 14, further comprising:

an electronic component between the first sidewall and the printed circuit board; and a battery spaced apart from the electronic component in the at least one axial direction in which the first sidewall extends, wherein at least a portion of the second board portion is between the electronic component and the battery.

16. An electronic device comprising:

a plate;

a side frame provided at an edge of the plate and extending in at least one axial direction, the side frame comprising a first sidewall comprising at least one conductive portion;

a printed circuit board provided on a surface of the plate and comprising at least one ground area;

a key assembly provided on a portion of the side frame and comprising a first flexible circuit board connected to the printed circuit board; and an antenna assembly comprising:

the at least one conductive portion;

a first connection member provided inside the first sidewall, the first connection member being electrically connected to at least one of the at least one conductive portion;

a second connection member provided inside the first sidewall and spaced apart from the first connection member, the second connection member being electrically connected to at least one of the at least one conductive portion; and a third connection member between the first connection member and the second connection member, the third connection member being electrically connected to at least one of the at least one conductive portion, wherein the second connection member is electrically connected to the first flexible circuit board, and the third connection member is electrically connected to the at least one ground area.

17. The electronic device of claim 16, wherein the antenna assembly further comprises at least one first signal line accommodated in the first flexible circuit board and configured to transmit a feeding signal, and wherein the at least one first signal line is electrically connected to at least one of the first connection member or the second connection member.

18. The electronic device of claim 16, wherein the first flexible circuit board comprises at least one second signal line configured to transmit a digital signal and electrically connecting the key assembly and the printed circuit board.

19. The electronic device of claim 16, wherein the first connection member is connected to the second connection member at one point through a first electrical path, and the second connection member is connected to the at least one ground area through a second electrical path from the one point.

20. An electronic device comprising:

a frame comprising at least one conductive portion;

a printed circuit board within the frame and comprising at least one ground area;

a key assembly on a portion of the frame and comprising a first flexible circuit board connected to the printed circuit board; and a plurality of antenna modules comprising:

the at least one conductive portion;

a first connection member inside the frame, the first connection member being electrically connected to the first flexible circuit board and at least one of the at least one conductive portion;

a second connection member inside the frame and spaced apart from the first connection member, the second connection member being electrically connected to the first flexible circuit board and at least one of the at least one conductive portion;

a third connection member between the first connection member and the second connection member, the third connection member being electrically connected to the at least one ground area and at least one of the at least one conductive portion;

a first antenna module electrically connected to the first connection member; and a second antenna module spaced apart from the first antenna module along the frame with the third connection member interposed therebetween, the second antenna module being electrically connected to the second connection member.

* * * * *